United States Patent
An

(10) Patent No.: US 9,916,864 B2
(45) Date of Patent: Mar. 13, 2018

(54) METHOD AND APPARATUS FOR MANAGING IMAGES USING A VOICE TAG

(71) Applicant: Samsung Electronics Co., Ltd., Suwon-si (KR)

(72) Inventor: Ki Mo An, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 48 days.

(21) Appl. No.: 14/882,879

(22) Filed: Oct. 14, 2015

(65) Prior Publication Data

US 2016/0104511 A1    Apr. 14, 2016

(30) Foreign Application Priority Data

Oct. 14, 2014  (KR) .................. 10-2014-0138108

(51) Int. Cl.
| | |
|---|---|
| *H04N 5/93* | (2006.01) |
| *H04N 9/80* | (2006.01) |
| *G11B 27/10* | (2006.01) |
| *H04N 1/21* | (2006.01) |
| *H04N 5/91* | (2006.01) |

(Continued)

(52) U.S. Cl.
CPC .............. *G11B 27/10* (2013.01); *G10L 15/08* (2013.01); *G10L 15/265* (2013.01); *H04N 1/00* (2013.01); *H04N 1/212* (2013.01); *H04N 5/91* (2013.01); *H04N 2201/0084* (2013.01)

(58) Field of Classification Search
CPC .......... G11B 27/10; H04N 1/212; H04N 5/91; H04N 2201/0084; G10L 15/08; G10L 15/265

USPC ....... 386/285, 224, 239, 241, 248, 278, 281, 386/282

See application file for complete search history.

(56) References Cited

U.S. PATENT DOCUMENTS

| | | | |
|---|---|---|---|
| 8,260,809 B2 | 9/2012 | Platt et al. | |
| 2005/0161510 A1* | 7/2005 | Kiiskinen | G10L 15/26 235/472.01 |

(Continued)

FOREIGN PATENT DOCUMENTS

| | | | |
|---|---|---|---|
| JP | 2008/072572 A | 3/2008 | |
| WO | 2007/149609 A2 | 12/2007 | |

(Continued)

OTHER PUBLICATIONS

European Search Report for Appln. No. 15188938 dated May 30, 2016.

(Continued)

*Primary Examiner* — Robert Chevalier
(74) *Attorney, Agent, or Firm* — McAndrews, Held & Malloy, Ltd.

(57) ABSTRACT

An electronic device is provided. The electronic device includes a voice input module which receives a voice from an outside to generate voice data, a memory which stores one or more images or videos, and a processor which is electrically connected to the voice input module and the memory. The memory includes instructions, when executed by the processor, causing the electronic device to link at least one of the voice data, the first metadata information based on the voice data, or second metadata information generated from the voice data and/or the first metadata information with the second image or video.

25 Claims, 12 Drawing Sheets

(51) Int. Cl.
    G10L 15/08    (2006.01)
    G10L 15/26    (2006.01)
    H04N 1/00     (2006.01)

(56) References Cited

U.S. PATENT DOCUMENTS

| | | |
|---|---|---|
| 2005/0192808 A1* | 9/2005 | Sugiyama ......... G06F 17/30265 |
| | | 704/270 |
| 2007/0294273 A1 | 12/2007 | Bendeck et al. |
| 2009/0006345 A1 | 1/2009 | Platt et al. |
| 2013/0121589 A1 | 5/2013 | Gokturk et al. |
| 2013/0346068 A1* | 12/2013 | Solem ............... G06F 17/30268 |
| | | 704/9 |
| 2014/0082465 A1 | 3/2014 | Jee et al. |
| 2014/0160316 A1 | 6/2014 | Hwang |

FOREIGN PATENT DOCUMENTS

| | | |
|---|---|---|
| WO | 2011/109137 A1 | 9/2011 |
| WO | 2011109137 | 9/2011 |

OTHER PUBLICATIONS

Notification of Transmittal of the International Search Report and the Written Opinion of the International Searching Authority, or the Declaration dated Jan. 22, 2016 corresponding to International Application No. PCT/KR2015/010592.
International Search Report dated Jan. 22, 2016 corresponding to International Application No. PCT/KR2015/010592.
Written Opinion of the International Searching Authority, or the Declaration dated Jan. 22, 2016 corresponding to International Application No. PCT/KR2015/010592.

* cited by examiner

METHOD AND APPARATUS FOR MANAGING IMAGES USING A VOICE TAG

RELATED APPLICATION(S)

This application claims the benefit under 35 U.S.C. § 119(a) of a Korean patent application filed on Oct. 14, 2014 in the Korean Intellectual Property Office and assigned Serial No. 10-2014-0138108, the entire disclosure of which is hereby incorporated by reference.

BACKGROUND

The present disclosure relates to a display controlling method and an electronic device.

Recently-available electronic devices, such as a smart phone or a tablet, are generally equipped with a camera. Performance of these cameras in such electronic device is equal to or better than a conventional digital single lens reflex (DSRL) or digital camera. For example, Samsung Galaxy S5 is equipped with a rear camera which numerous supports functions such as auto focusing (AF), out-focusing, optical image stabilizer (OIS), and the like, and which includes 16-mega pixels of an ISOCELL-type.

A camera of such an electronic device provide high quality photos without a user needing to possess a high degree of photo shooting technique, and the number of events that a camera is utilized by a user rapidly increases, because the use of the camera becomes simpler (e.g., it is possible to use a camera function even at a home screen of a locked electronic device). Photos which are obtained using such a camera are stored together with tag information.

A captured photo (or image) may be stored in the form of an image file. Using a photo management application, such as a gallery application, a user arranges images by a folder unit, or arranges images in an order of captured date, file size, or resolution. However, if the number of captured photos rapidly increases, it is inefficient to search for a desired photo among a lot of photos using a conventional method.

SUMMARY

An aspect of the present disclosure is to provide an electronic device. The electronic device may input a voice tag to an original image and may assign the same tag to other images similar to the original image, thereby allowing a user to search for a desired photo effectively using the voice tag.

In accordance with an aspect of the present disclosure, an electronic device may include a voice input module to obtain voice data on a specific image, and a control module to analyze the voice data to determine metadata information of the specific image. Also, the control module may be configured to register the voice data with respect to at least one association image, which satisfies a specific reference with respect to the specific image or the determined metadata information, from among a plurality of images as a voice tag.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
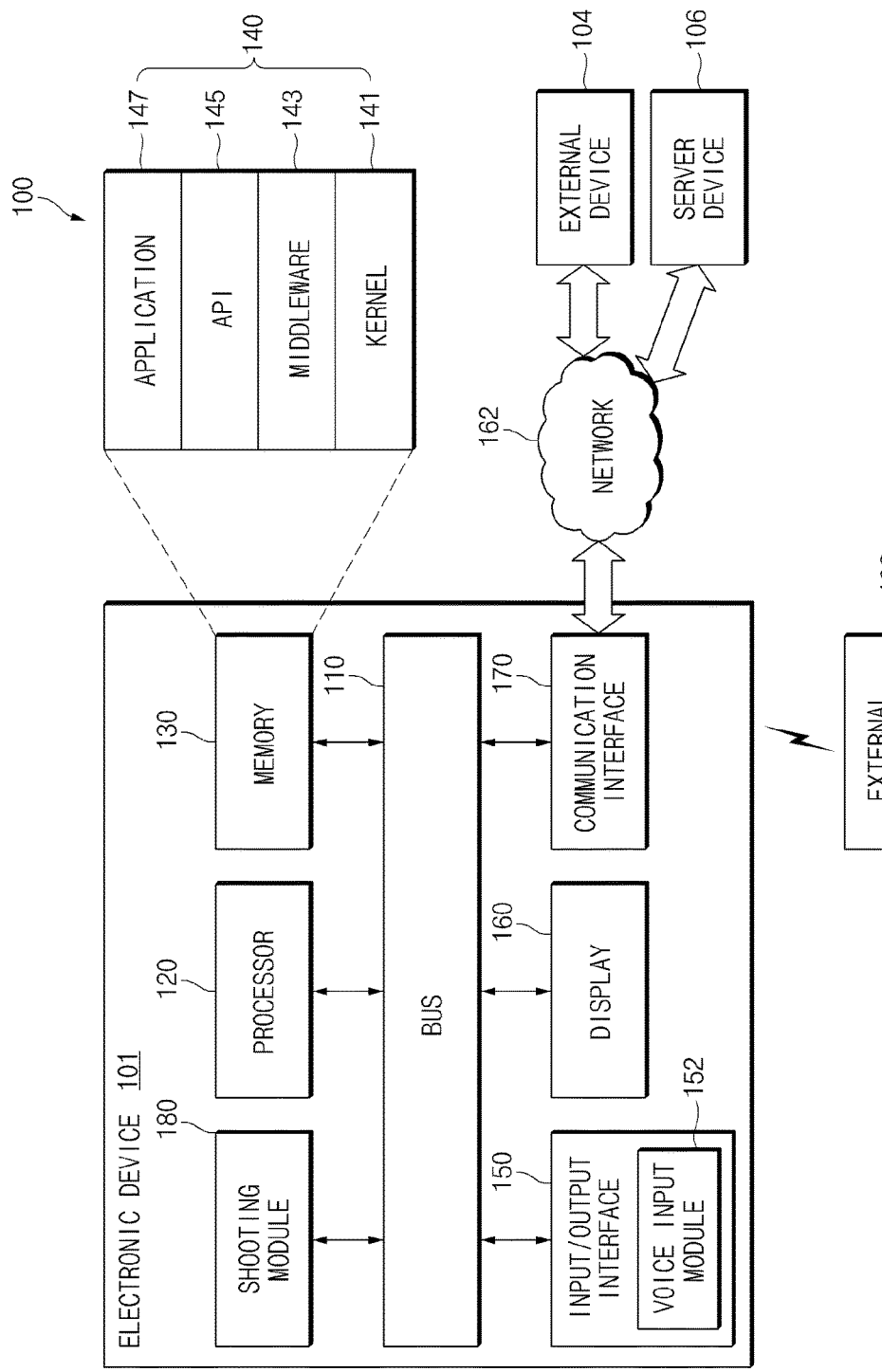
FIG. 1 is a diagram illustrating an electronic device in a network environment, according to various embodiments of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have," "may have," "include" and "comprise," "may include," "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable" of operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs that are stored in a memory.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like), magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like).

The electronic devices according to an embodiment of the present disclosure may be one or more combinations of the above-mentioned devices. According to a certain embodiment of the present disclosure, an electronic device may be a flexible electronic. Also, electronic devices according to various embodiments of the present disclosure are not limited to the above-mentioned devices, and may include new electronic devices according to technology development Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an electronic device in a network environment, according to various embodiments of the present disclosure.

Referring to FIG. 1, there is illustrated an electronic device 101 in a network environment 100 according to various embodiments of the present disclosure. The electronic device 101 may include a bus 110, a processor 120, a memory 130, an input/output (I/O) interface 150, a display 160, and a communication interface 170. The electronic device 101 may further include a shooting module 180. According to an embodiment of the present disclosure, the electronic device 101 may not include at least one of the above-described components or may further include other component(s).

The bus 110 may interconnect the above-described components: processor 120, memory 130, input/output (I/O)

interface 150, display 160, communication interface 170 and shooting module 180, and may be a circuit for conveying communications (e.g., a control message and/or data) among the above-described components.

The processor 120 may include one or more of a central processing unit (CPU), an application processor (AP), or a communication processor (CP). The processor 120 may perform, for example, data processing or an operation associated with control or communication of at least one other component(s) of the electronic device 101. According to various embodiments of the present disclosure, the processor 120 may be understood as being a control module and may include a graphics processing module (e.g., a graphics processing unit (GPU)). The processor 120 may further include a sub-module such as an analysis module for analyzing voice data.

The memory 130 may include a volatile and/or nonvolatile memory. The memory 130 may store instructions or data associated with at least one other component(s) of the electronic device 101. According to various embodiments of the present disclosure, the memory 130 may store software and/or a program 140. The memory 130 may include, for example, a kernel 141, a middleware 143, an application programming interface (API) 145, and/or an application (or an application program) 147. At least a portion of the kernel 141, the middleware 143, or the API 145 may be called an "operating system (OS)."

According to various embodiments of the present disclosure, the memory 130 may store a plurality of photos or videos which are captured by the shooting module 180 or are obtained through the communication interface 170. Furthermore, the memory 130 may include an application 147 (e.g., a gallery application) for editing or managing a plurality of images or videos.

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to the at least one of the application program 147. For example, the middleware 143 may process the one or more task requests according to the priority assigned to the at least one application program 147, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other component(s) of the electronic device 101. Furthermore, the I/O interface 150 may output an instruction or data, received from other component(s) of the electronic device 101, to a user or another external device.

The I/O interface 150 may include a voice input module 152 which obtains a voice input from a user. The voice input module 152 may be, for example, a microphone.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may establish communication between the electronic device 101 and an external electronic device (e.g., a first external electronic device 102, a second external electronic device 104, or a server 106). For example, the communication interface 170 may be connected to a network 162 through wireless communication or wired communication to communicate with the external device (e.g., a second external electronic device 104 or a server 106).

The wireless communication may include at least one of, for example, LTE, LTE-A, CDMA, WCDMA, UMTs, WiBro, GSM, or the like, as cellular communication protocol. Furthermore, the wireless communication may include, for example, a local area network 164. The local area network 164 may include, for example, at least one of wireless fidelity (Wi-Fi), Bluetooth, near field communication (NFC), global positioning system (GPS), or the like. The wired communication may include at least one of, for example, a universal serial bus (USB), a high definition multimedia interface (HDMI), a recommended standard-132 (RS-132), or a plain old telephone service (POTS). The network 162 may include at least one of telecommunications networks, for example, a computer network (e.g., LAN or WAN), an internet, or a telephone network.

Each of the first and second external electronic devices 102 and 104 may be a device of which the type is different from or the same as that of the electronic device 101. According to an embodiment of the present disclosure, the server 106 may include a group of one or more servers. According to various embodiments of the present disclosure, all or a part of operations that the electronic device 101 will perform may be executed by another or plural electronic devices (e.g., the external electronic devices 102 and 104 and the server 106). According to an embodiment of the present disclosure, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the external electronic device 102 or 104 or the server 106). The other electronic device (e.g., the external electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
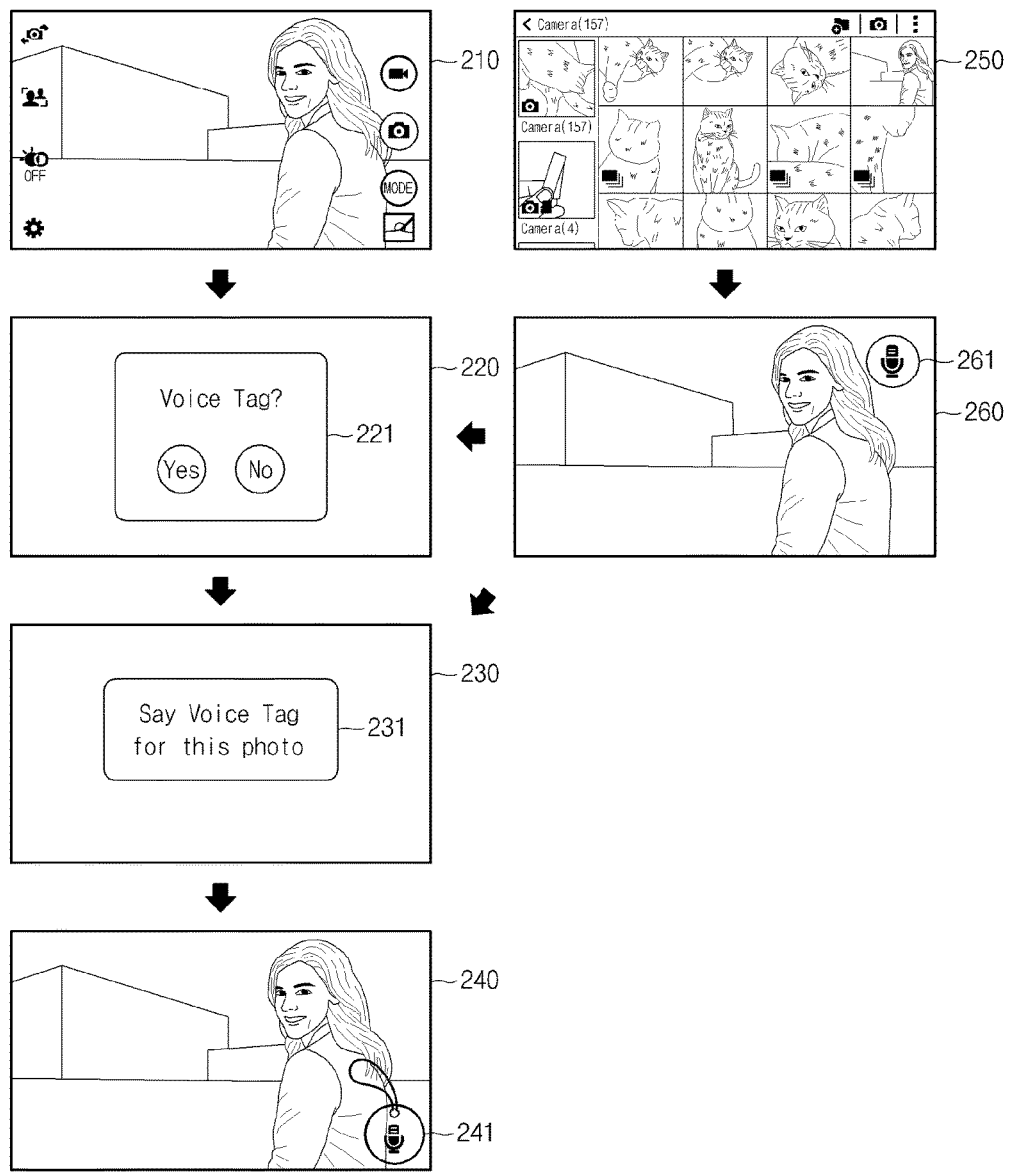
FIG. 2 is a diagram schematically illustrating a user interface for registering a voice tag, according to various embodiments of the present disclosure.

FIG. 2 is a diagram schematically illustrating a user interface (UI) for registering a voice tag, according to various embodiments of the present disclosure.

A voice tag may be registered using various methods. Below, a method for registering a voice tag in connection with a shooting operation and a method for registering a voice tag by selection of a user will be described. However, the scope and spirit of the present disclosure may not be limited thereto. The present disclosure may be variously modified or changed, and is not limited to methods disclosed herein.

A user of an electronic device (e.g., an electronic device 101) may take an object using a camera (e.g., a shooting module 180) mounted on the electronic device. For example, referring to a screen 210, the user may adjust a desired shooting mode using at least one button displayed at the screen 210 and may provide a touch input on a specific button (e.g., a camera-shaped button) to capture an object.

According to various embodiments of the present disclosure, if shooting is made, the electronic device 101 may provide a screen including a user interface (UI) for determining whether to register a voice tag. For example, there may be provided a screen 220 which includes a UI 221 querying whether to register a voice tag. The user may input a voice tag through a proper response on the UI 221, for example, through selection of a "Yes" button.

An UI, such as the screen 220, may be provided according to various situations. For example, the screen 220 may be automatically provided if a camera 180 captures an object. Alternatively, the screen 220 may be provided if a predetermined input is received from the user after the object is captured. For example, the screen 220 for querying whether to input a voice tag may be provided if there occurs the following operation: a physical button is pushed over a constant time after shooting or an electronic device shakes from side to side.

According to various embodiments of the present disclosure, the UI 221 may be provided after a photo is taken and a time (e.g., two seconds) elapses. Furthermore, the UI 221 may disappear from a display 160 if no input is received during a time (e.g., 1.5 seconds) after the UI 221 is provided. A value of the time (e.g., two seconds, 1.5 seconds, or the like) may be varied by a user input or may be varied according to a setting of a system (electronic device) or an operation environment. Furthermore, according to various embodiments of the present disclosure, the UI 221 may be provided even before a photo is captured. For example, screen 210 could be provided with an additional button "voice tag+photo" or "voice tag+video", allowing a user to register first a voice tag and to take a photo or register a video afterwards. For example, a screen 230 for registration of a voice tag may be provided after the screen 220 including the UI 221 is provided and a photo is captured at the screen 210.

In general, a user may change an object, a focus, composition, and the like after the photo shooting to continue to perform photo shooting. An object (an object is slightly variable according to movement of an electronic device or camera shake) currently held by a lens may be displayed on a display of an electronic device which remains in a shooting mode while preparing next shooting. At this state, an icon (or a menu) (e.g., voice input icon 261 of a screen 260) for inputting a voice tag at a screen (e.g., a screen 210) of a current shooting mode may be provided on at least a part (e.g., a right top, a bottom center or the like of a screen) of a screen. If a corresponding icon is selected, an electronic device may provide a screen 220 for inputting a voice tag with respect to a just previously captured photo. This exemplification may be used as a method for marking a photo, which a user determines as being successfully captured, when continuously capturing many photos.

If a user intends to register a voice tag at a photo (e.g., a user selects "Yes" of the UI 221), the screen 230 for a voice input may be provided. The screen 230 may also provide a suitable guide message 231 (e.g., Say voice tag for this photo). If a user provides a voice input, the electronic device may produce a data file using the voice input and may register the data file at a corresponding photo. According to various embodiments of the present disclosure, the electronic device 101 may convert a voice input into a text using a voice recognition function and the like and may register a text tag, which is generated by converting a voice input into a text, at a corresponding photo together with a voice tag corresponding to the voice input. A method for registering a voice tag (or a voice tag and/or a converted text tag) at a photo may not be limited to the above-described exemplification, and various methods may be used.

A photo at which a voice tag is registered may include, for example, a voice tag icon 241 as illustrated in a screen 240. This may be exemplary, and that a voice tag is registered at a corresponding image may be expressed using a variety of methods. According to some embodiments of the present disclosure, even though a voice tag is registered at a photo, the voice-tagged photo may not be marked substantially the same as other images at which a voice tag is not registered.

Voice data which a user registers may be reproduced if a voice tag icon 241 is selected by the user. Alternatively, a text converted through voice recognition may be temporarily displayed during a time when the voice tag icon 241 is selected. According to various embodiments of the present disclosure, a variety of menus, such as voice listening, association image search, voice tag deletion, and the like may be provided around the voice tag icon 241, while a touch input (or a hovering input using an electronic pen and the like) on the voice tag icon 241 is maintained.

According to various embodiments of the present disclosure, a voice tag may be registered through any other operation which is discrete from a shooting operation. For example, the user may determine an image list stored on the electronic device through an image management application such as a gallery application as illustrated in a screen 250. If the user selects a photo, the selected photo may be provided as illustrated in a screen 260. The screen 260 may include a corresponding photo and a voice input icon 261 for guiding registration of a voice tag. If the voice input icon 261 is selected, a screen for a voice input such as the screen 230 may be provided. According to some embodiments of the present disclosure, after the screen 220 is provided, the screen 230 may be provided according to a user input. The following procedure may correspond to the above description.

According to various embodiments of the present disclosure, displaying of the screen 220 may be omitted. For example, the screen 230 for a voice input may be provided just after shooting, or the screen 230 may be immediately provided at the screen 260.

If a voice input on a specific photo is registered as a voice tag by the user, the electronic device 101 may perform searching for a photo having a relation with a specific photo to register the same voice tag. Here, the relation may mean a photo similar to the specific photo, but may be interpreted as encompassing various meanings of relations such as geographical relation, temporal relation, and the like.

For example, in the case where a maple tree is included in a photo captured at a botanical garden and a user registers a voice tag of "botanical garden" at a corresponding photo, the electronic device 101 may search for any other image (e.g., a similar photo including a maple tree) similar to the photo and may register the same voice tag, that is, the voice tag of "botanical garden." According to various embodiments of the present disclosure, however, the electronic device 101 may analyze a voice input (e.g., "botanical garden") inputted by a user and may determine that a meaning of the voice input corresponds to a specific category (e.g., a place), based on the analysis result. In this case, the electronic device 101 may determine suitable metadata information 320 (e.g., area information, GPS coordinates information, and the like on a place where a photo is captured) among metadata information 320 of the photo and may register the voice tag of "botanical garden" at any other image (e.g., a photo captured at the same area or an image captured within a distance of 1 Km from the GPS coordinates) which satisfies a reference with respect to corresponding metadata information 320.

Below, there will be described information used to determine an image having a relation with a specific image, and there will be described a method for determining an association image using each piece of information and registering a voice tag.

Figure 3:
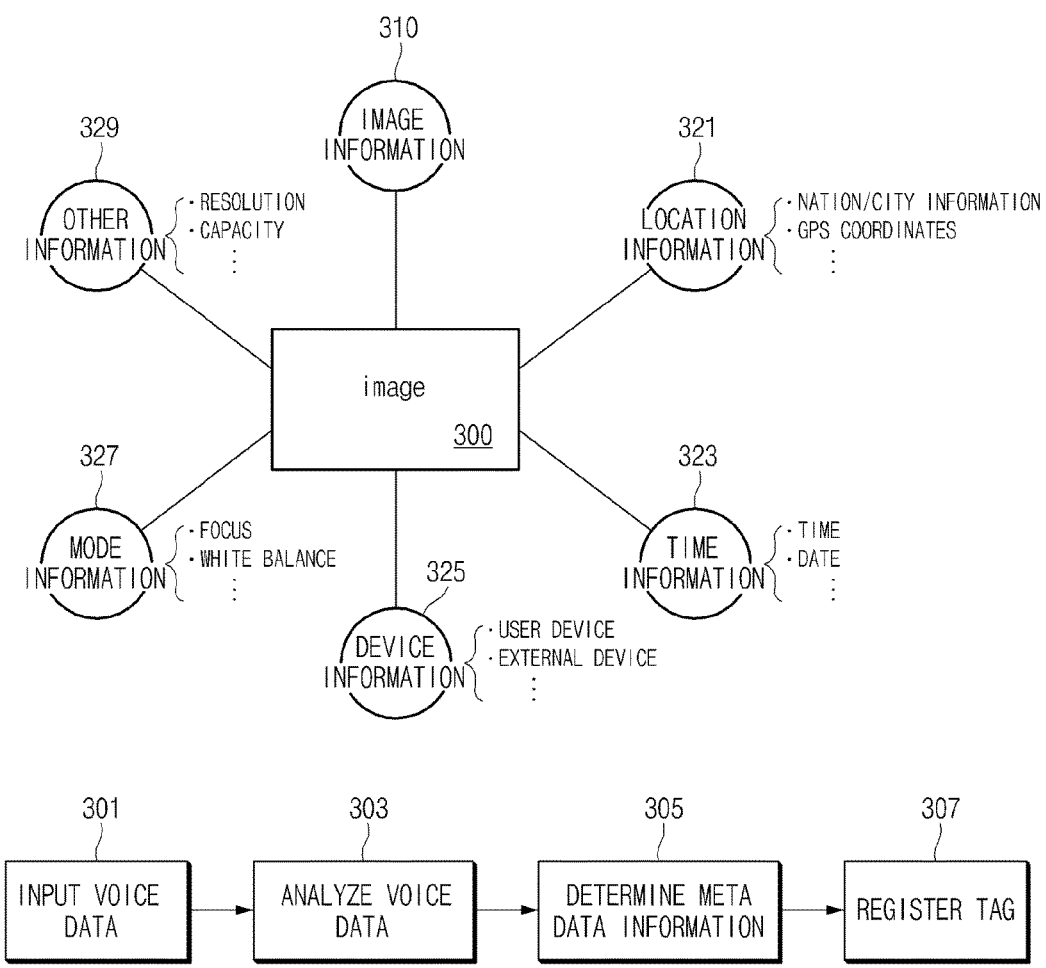
FIG. 3 is a diagram schematically illustrating metadata information and a tag registration process using the metadata information, according to various embodiments of the present disclosure.

FIG. 3 is a diagram schematically illustrating metadata information 320 and a tag registration process using the metadata information, according to various embodiments of the present disclosure.

According to various embodiments of the present disclosure, a variety of information included in a specific image 300 may be used to register a voice tag. First of all, information of an image itself may be used. For example, an object (e.g., sea, nightscape, sky, grassland, mountain, building, and the like) which an image expresses, an object (e.g., cat, baby, book, coffee, food, and the like) included in the image, color distribution of the image, or the like may be used to register a voice tag. As such, information visually provided through an image may be simply expressed as image information 310. A processor 120 of an electronic device 101 may determine similarity (e.g., similarity of 75%) between a specific image 300 and any other image based on the image information 310, for example, using an image processing technique and the like.

The specific image 300 may include a variety of metadata information 320 as well as the image information 310 visually provided. The metadata information 320 may include location information 321 indicating a location where the specific image 300 is captured, time information 323 indicating a time when the specific image 300 is captured, device information 325 indicating information on a device capturing the specific image 300, mode information 327 indicating a shooting mode used at point in time when the specific image 300 is captured, and a variety of other information 329 (e.g., resolution of an image file, capacity, file name, folder where a file is stored, and the like).

The location information 321 may include information on a nation, a city, an area, a specific building or a position where the specific image 300 is captured. Furthermore, the location information 321 may include a geographical information such as GPS coordinates. According to various embodiments of the present disclosure, the location information 321 may include information on a network access point (AP) or a base station connected at a point in time when the specific image 300 is captured.

The time information 323 may include information on a time when the specific image 300 is captured. For example, the time information 323 may include information on year, month, date, hour, minute, second, and the like when the specific image 300 is captured. According to various embodiments of the present disclosure, the time information 323 may be used without modification or may be changed into any other format (e.g., season, am/pm, sunset/sunrise, or a lunar date and the like) before the use.

The device information 325 may include information on the capture device used to capture the specific image 300. For example, the device information 325 may include information on a model name, a maker, a type of used lens of a shooting device, or the like or whether the shooting device is the same as a user device which displays the specific image 300 (e.g., whether the image is captured by an electronic device 101 or whether the specific image 300 captured by an external device is transmitted to the electronic device 101 through a network and the like) and the like.

The mode information 327 may include information on a shooting mode used at a point in time when the specific image 300 is captured. In detail, the mode information 327 may include information on whether the following techniques are used at shooting: focusing, out-focusing, flash, white balance (or level thereof), correction, proximity shooting, night mode and the like.

Below, there will be described a method for determining an association image based on a result of determining one or more of pieces of metadata information 320.

If voice data of a user is received with respect to the specific image 300 in operation 301, the processor 200 may analyze the voice data in operation 303. The processor 120 may further include a language model, a voice recognition module or a sound spectrum analysis engine which is used to analyze voice data. The processor 120 may analyze the voice data to determine a meaning thereof. For example, the processor 120 may determine a received voice as "sea" based on a result of analyzing the voice data. The processor 120 may classify a meaning of voice data as a specific category (e.g., a location category for "sea") and may determine metadata information 320 (e.g., location information for "sea") corresponding to a corresponding category.

To determine metadata information 320 based on voice data, the processor 120 may use image information 310 as well as analyze voice data itself. For example, in the case where a user provides a voice input of "[me:t]," it may not be clear to determine whether a voice input is "meet" or "meat," through a voice data-based analysis. In the case where "meat" appears at a current specific image 300, the processor 120 may analyze corresponding voice data as "meat" using the image information 310 (e.g., an object appearing at a specific image 300, that is, "meat").

According to various embodiments of the present disclosure, the processor 120 may determine a meaning of a voice input through a server 106. For example, the processor 120 may provide the voice data, which is inputted by a user, and the specific image 300 to the server 106 through a communication interface 170 and may receive a result analyzed by the server 106. The processor 120 may use the received result to determine metadata information 320.

If the voice data is analyzed in operation 303, the processor 120 may determine at least one of segments of metadata information 320 such as location, time, shooting device, shooting mode, or the like, based on a relation between an analysis result on voice data and each of portions of metadata information 320 included in metadata information 320 and specifically, information 321, 323, 325, 327, or 329. For example, in the case where voice inputs such as sea, Dokdo, botanical garden, department store, and the like are analyzed as being associated with a position, the processor 120 may determine the location information 321 as metadata information 320. For example, in the case where voice inputs such as nightscape, sunset, sunrise, birthday, and the like are associated with a date or a time, the processor 120 may determine the time information 323 as metadata information 320.

The processor 120 may determine two or more pieces of metadata information 320 with respect to a piece of voice data. For example, in the case where a voice input is "summer sea," the time information 323 and the location information 321 may be determined.

In the case where voice data does not have a suitable category corresponding to metadata information, for example, in the case where voice input is regardless of a position, a time, an image shooting device, etc. like "keyboard," the processor 120 may determine predetermined suitable metadata information 320. In the above exemplification, the processor 120 may determine the location information 321, the time information 323, and the mode information 327 as metadata information 320, which is used to register a voice tag, with respect to the voice input of "keyboard." In this case, the processor 120 may register a voice tag of "keyboard" with respect to other images captured under conditions of a position, a mode (e.g., proximity shooting mode) and a date that are similar to those of a specific image 300 where a voice tag of "keyboard" is registered. As will be described later, the other images may be images determined as being somewhat similar to the image (e.g., a photo including a keyboard), using the image information 310.

Below, an operation (e.g., operation 307) in which a voice tag is registered based on a result of determining an association image using image information 310 and metadata information 320 will be described.

The processor 120 may determine an image, which is determined as being associated with the specific image 300, from among a plurality of images stored on a memory 130 of an electronic device 101 by using the image information 310 and metadata information. An image corresponding to a target to be determined may not need to be stored on the memory 130. For example, determining whether or not of to allow an association image may be performed with respect to images stored on a cloud server (e.g., a server 106). This will be described with reference to FIG. 10. Below, how images are stored on the electronic device 101 will be described for the sake of easy description.

The processor 120 may utilize various methods to determine an image associated with a specific image 300. For example, the processor 120 may determine an image, which has similarity of a threshold value or more, as an association image using the image information 310. To compare images, the processor 120 may include an image processing module or may use an image processing algorithm.

According to various embodiments of the present disclosure, a threshold value on the similarity may be variously set. For example, a setting may be made such that an image with a similarity greater than or equal to 70% is determined as an association image. Alternatively, a setting may be made such that an image with a similarity greater than or equal to 95% is determined as an association image. According to various embodiments of the present disclosure, the image information 310 may include information on an object (e.g., tree, vehicle, person, food and the like) included in the specific image 300, and the processor 120 may determine an association image by determining a similarity between an object, included in the specific image 300, or an object, occupying the greatest ratio, from among objects included therein and an object included in any other image.

The above exemplification may be described under the assumption that a similarity of an image is greater than or equal to a threshold value. According to various embodiments of the present disclosure, however, a threshold value may be replaced with a predetermined range. For example, an image having a very high similarity (e.g., a similarity of 95 to 100%) may be an image on the same subject obtained through continuous shooting (or a burst mode). According to various embodiments of the present disclosure, it may be efficient to determine an image, having a similarity of a predetermined range (e.g., a similarity of 50 to 80%), as an association image rather than attaching a voice tag to substantially the same images (i.e., having a very high similarity).

The processor 120 may use metadata information 320 to determine an association image. For example, the processor 120 may determine any other image, which has, as metadata information 320, a shooting location belonging within a specific range from a location where the specific image 300 is captured, as an association image using the location information 321. For example, in the case where a location where the specific image 300 is captured is Incheon airport, the processor 120 may determine an image, which includes location information corresponding to the Incheon airport as metadata information 320, as an association image. Alternatively, the processor 120 may determine, for example, an image, which includes, as metadata, a location included in a specific range (e.g., 2 Km) from GPS coordinates where the specific image 300 is captured, as an association image.

According to various embodiments of the present disclosure, the processor 120 may determine an image, which has, as metadata information 320, a shooting time having a predetermined relation with a time when the specific image 300 is captured, as an association image. For example, a control module 120 may determine an image, which includes, as metadata information, time information belonging within a specific range (e.g., two hours before and after a time) from the time when the specific image 300 is captured (e.g., Mar. 1, 2014, 2 a.m.), as being an association image.

According to various embodiments of the present disclosure, the processor 120 may determine an image, which includes, as metadata information, time information having a specific relation with a time when the specific image 300 is captured, as an association image. For example, the processor 120 may determine an image, which includes, as metadata, the same date (e.g., March 3) as a time when the specific image 300 is captured, as an association image. Alternatively, the processor 120 may determine, for example, an image, which has, as metadata information, a point in time when a specific date passes from a time when the specific image 300 is captured, as an association image. Alternatively, in the case where the specific image 300 is captured at a sunrise time zone, the processor 120 may determine images of which the shooting time is included in the sunrise time zone, as an association image. In such embodiments, a user may verify a photo captured at a birthday every year using one voice tag or may easily verify photos corresponding to days when 100 days, 200 days, and 300 days pass from a specific anniversary, using one voice tag. Furthermore, the user may easily verify a photo on a time-dependent phenomenon, such as sunrise, sunset, glow, full moon or the like using one voice tag.

The above-described embodiments may be exemplary, and modification, expansion and application thereon may be variously made. For example, a photo captured by any other device, which is not an electronic device 101 of a user, using the device information 325 may be managed using a separate voice tag. Alternatively, a photo captured in a proximity shooting mode using the mode information 327 may be managed using a separate voice tag. Whether to use any information with respect to each case may be determined automatically or by a user setting. Furthermore, the processor 120 may determine an association image for registration of a voice tag using one or more of pieces of information described above. With regard to a method for determining association images using pieces of information, a method corresponding to the case that pieces of information have priorities will be described with reference to FIG. 7, and a method corresponding to the case that pieces of information have weights will be described with reference to FIG. 8. Below, a method for registering voice tags at the desired number of images using pieces of information will be described with reference to FIG. 4.

Figure 4:
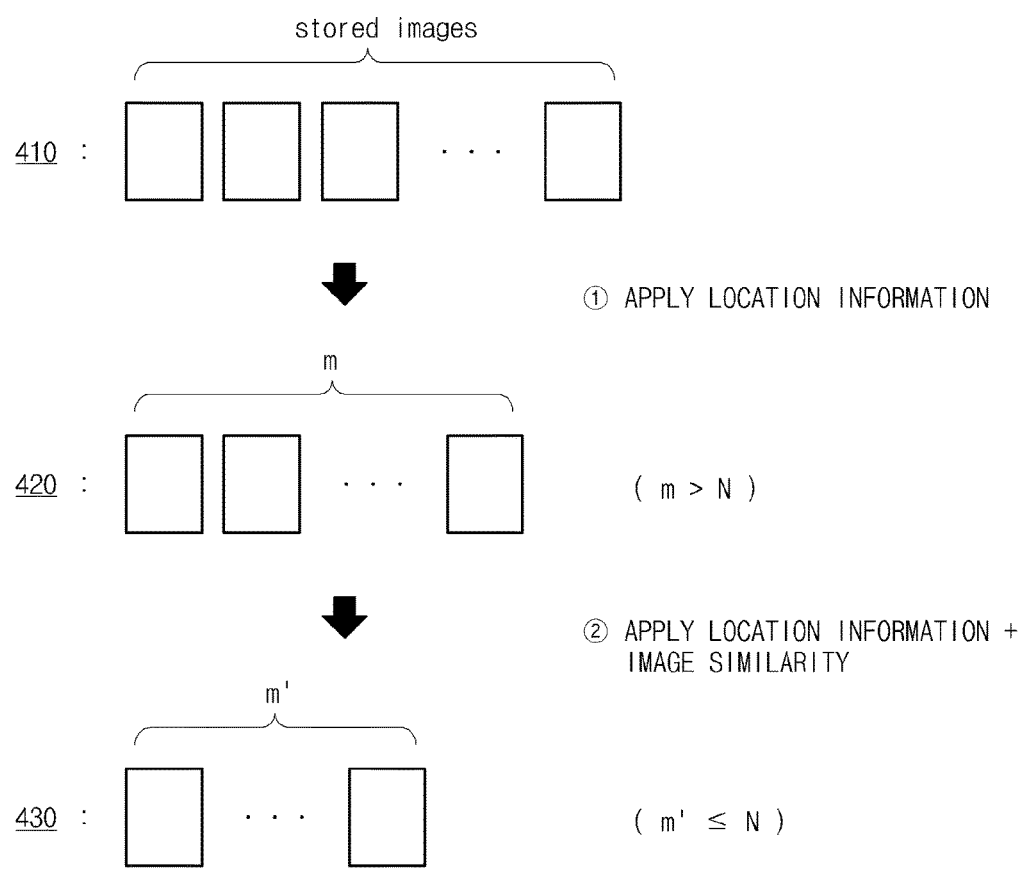
FIG. 4 is a diagram schematically illustrating a method for controlling the number of association images, according to various embodiments of the present disclosure.

FIG. 4 is a diagram schematically illustrating a method for adjusting the number of association images, according to various embodiments of the present disclosure.

Referring to FIG. 4, an electronic device 101 may include a plurality of stored images 410. Registering of the same voice tag as a voice tag may be performed with respect to any other image which has a relation with a specific image (e.g., an specific image 300) at which the voice tag is registered by a user. The registering may be manually performed by a user input (instruction), may be performed just as soon as a user carries out a search operation using a voice tag, or may be performed in the background in the case where an electronic device 101 remains at a standby state or an idle state.

A processor 120 may obtain voice data corresponding to a voice tag. The voice data may be obtained at the time when the specific image is captured or may be obtained from a voice tag which is previously registered at a specific image. If an analysis result on voice data indicates that voice data is associated with a location, the processor 120 may determine an association image using location information 321 of metadata information 320 of a specific image 300.

The number of images 420 determined as being an association image on the location information 321 may be "m" (e.g., 245). If the number of association images set by a user and the like is smaller than or equal to "N" (e.g., 50), the processor 120 may determine an association image using both the location information 321 and image information 310. The determining step may be understood as determining an association image using the image information 310 with respect to images 420 (using the images 420 as population).

If the number of association images 430 (i.e., images including location information 321 and metadata information 320 of a distance condition and satisfying a similarity of a condition to a specific image (e.g., specific image 300)) determined as association images using the location information 321 and the image information 310 is m' (e.g., 47) and m' is smaller than N, the processor 120 may finally determine the images 430 as association images. The processor 120 may register the voice data as a voice tag at the association images 430.

In the above-described embodiment, if the number (m') of images 430 determined using the location information 321 and the image information 310 is greater than N, the processor 120 may repeat the determining using additional metadata information 320 (e.g., time information 323 and the like) until m' becomes smaller than N.

According to various embodiments of the present disclosure, m' may be adjusted to have a predetermined range (e.g., n<m'<N). m' may not only have a value smaller than N, but it may have a value greater than or equal to a specific value to allow the number of images, satisfying a similarity of a predetermined condition to a specific image (e.g., specific image 300), to maintain a constant range. This will be described with reference to FIG. 8.

Figure 5:
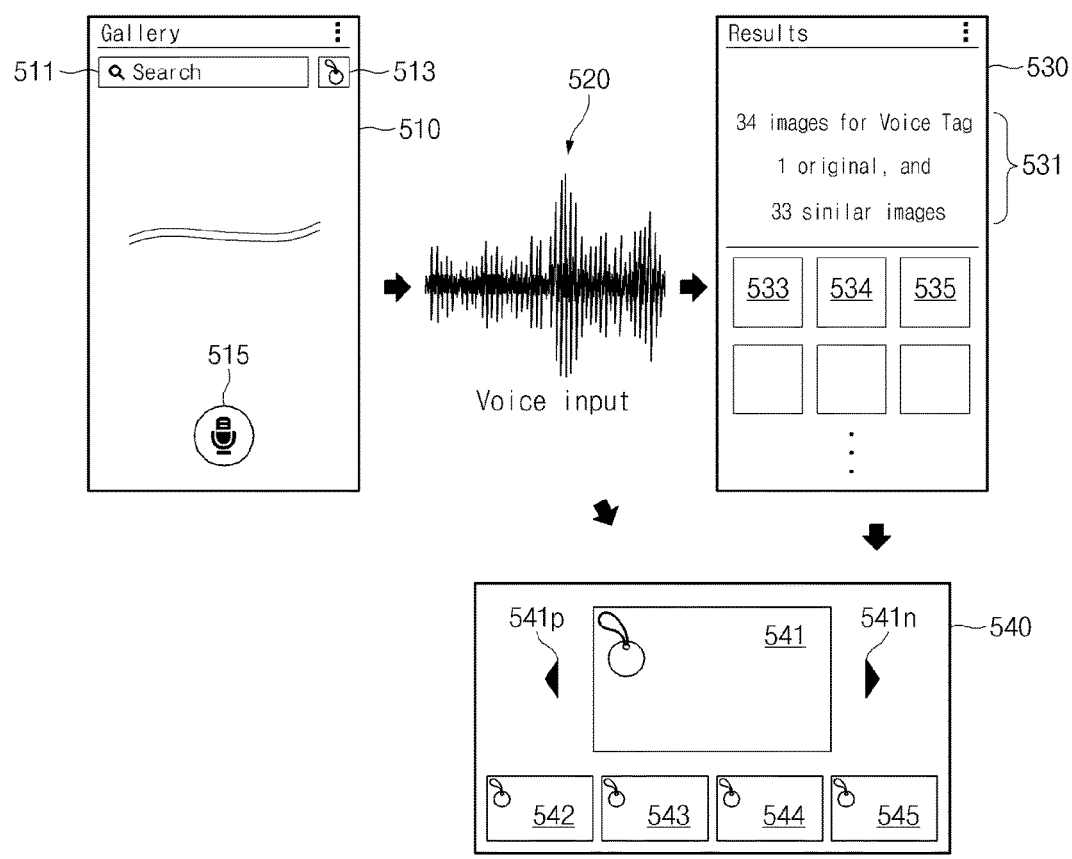
FIG. 5 is a diagram schematically illustrating a method for searching for an image having a voice tag, according to various embodiments of the present disclosure.

FIG. 5 is a diagram schematically illustrating a method for searching for an image having a voice tag, according to various embodiments of the present disclosure.

According to various embodiments of the present disclosure, there may be provided an UI 510 for finding an image having a voice tag. For example, a gallery application may provide a search menu 511. If the search menu 511 is selected, an input interface such as a typical keyboard/keypad may be provided together with a voice input button/key, and a user may select the voice input button/key to provide a voice input. A processor 120 may provide an image, which has a voice tag corresponding to a voice waveform similar (e.g., indicating a hit ratio of 95% or more) to the provided voice input, as a search result.

According to various embodiments of the present disclosure, if a voice tag menu 513 is selected, a list of currently registered voice tags may be provided. The list of voice tags may be provided in the form of an icon or may be provided together with a text corresponding to a voice tag. A user may select a provided voice tag to reproduce voice data corresponding to the selected voice tag and may search for image having the same voice tag.

According to various embodiments of the present disclosure, the user may activate a voice input function through selection of a voice input menu 515. If a voice input is provided under the condition, the processor 120 may search for an image(s) having a voice tag in the case where a voice tag corresponding to the voice input exists. In the case where a voice tag corresponding to the voice input does not exist, the processor 120 may perform an operation (e.g., S-voice or Siri and the like) of a general voice recognition application.

If a voice input 520 is provided by the user, an electronic device 101 may provide an UI such as a screen 530 or a screen 540. For example, the electronic device 101 may provide a search result 531 indicating that 34 images are found with respect to a voice tag corresponding to a voice input of a user, one thereof is a first image to which the user directly inputs a voice tag, and 33 images are images determined as association images of the first image. Furthermore, the electronic device 101 may display a found image or thumbnails 533, 534, 535, 536, 537, 538, etc. of an image together with the search result 531. In this case, the first found image 533 may be first of all displayed.

According to various embodiments of the present disclosure, the electronic device 101 may provide a search result on a voice input as illustrated in a screen 540. In this case, an original image 541 (e.g., the first found image 533) at which the user directly registers a voice tag may be displayed in the form of a relatively large thumbnail at the center, and images 542, 543, 544, 545, etc. at which the same voice tag is registered by an electronic device 101 (or a processor 120) as a consequence of determining that they are images associated with the original image 541 may be displayed in the form of a relatively small thumbnail at the bottom. If the user selects a function menu 541p or 541n, for example, in the case where the user directly registers the same voice tag at a plurality of images, the electronic device 101 may output a next original image (in the case where a function menu 541n is selected) (or a previous original image if the function menu 541p is selected). If the original image 541 is changed into any other original image, association images 542, 543, 544, and 545 displayed at the bottom may be replaced with association images of any other original image 541. If one of images provided at the screen 540 is selected, the selected image may be displayed at the whole screen.

According to the above description, the search result providing method may have various advantages. For example, the user may register a voice tag of "botanical garden" at a photo (a first image) which is captured at a botanical garden in 2013. The electronic device 101 may register the same voice tag at association images (a first image group) of the first image. If time information among metadata information 320 is used, a part of botanical garden photos captured in 2013 may be included in the first image group. In the case where the same voice tag of "botanical garden" is registered at a photo (a second image) captured at a botanical garden where a user visits in 2014, the electronic device 101 may register a voice tag of "botanical garden" at association images (a second image group) of the second image using image information and time information (2014's).

In the case where the user performs image search through a voice input of "botanical garden," photos corresponding to the first image, the second image, the first image group, and the second image group may be mixed and provided on a search result because having the same voice tag of "botanical garden." However, in the case where a search result is provided as illustrated in a screen 540, the first image, the second image, the first image group, and the second image group may be easily distinguishable. Indeed, the first and second image can be displayed as image 541, the images of the first group can be displayed as images 542, 543, 544, 545, etc. when the first image is shown as image 541, and the images of the second group can be displayed as images 542, 543, 544, 545, etc. when the second image is shown as image 541 (by using arrows 541p, 541n).

In the above exemplification, there may be described the case that time information among metadata information 320 is used, but the case that other metadata information 320 such as position information and the like is used may be also useful. For example, in the case where a user takes many photos at differently located botanical gardens, even though a voice input of "botanical garden" is used as a voice tag with respect to the botanical gardens, search results on a voice input of "botanical garden" may be distinguished according to locations of images captured at the respective botanical gardens.

According to various embodiments of the present disclosure, a screen 540 may be provided if an image of result images of the screen 530 is selected. For example, if an image 533 (original image) is selected at the screen 540, a first found image 533 may be output at a location corresponding to an image 541 in the screen 540, and association images of the first found image 533 may be outputted at the bottom of the screen 540. According to various embodiments of the present disclosure, if the electronic device 101 rotates in a landscape mode at a state of the screen 530, a result screen may be provided as illustrated in the screen 540.

Various exemplifications on an electronic device 101 according to various embodiments of the present disclosure which registers and searches for a voice tag may be described with reference to FIGS. 1 to 5. According to various embodiments of the present disclosure, an electronic device (e.g., an electronic device 101) may include a voice input module 152 configured to receive a voice from an outside to generate voice data, a memory 130, and a processor 120 electrically connected to the voice input module 152 and the memory 130. The memory 130 may be configured to store one or more images or videos, and the memory 130 comprises instructions, the instructions, when executed by the processor 120, causing the electronic device 101 to generate voice data on a voice received through the voice input module 152 with respect to a first image or video stored on the memory 130, link the voice data or first metadata information based on the voice data, with the first image or video, determine a relation between a second image or video, stored in the memory 130, and the first image or video, and link at least one of (1) the voice data, (2) the first metadata information, or (3) second metadata information 320b generated from the voice data and/or the first metadata information with the second image or video, based on at least a part of the determined relation.

According to various embodiments of the present disclosure, the electronic device 101 may link the first metadata information with the first image or video in the form of a tag, and the electronic device 101 may be configured to link at least one of (1) the voice data, (2) the first metadata information, or (3) the second metadata information 320b with the second image or video in the form of a tag. Here, for example, the first metadata information may include speech-to-text information extracted from the voice data. Furthermore, the electronic device 101 may determine the relation using at least one of an image analysis, location information, time information, text information, or face recognition information associated with the first image or video and the second image or video.

According to various embodiments of the present disclosure, an electronic device 101 may include a voice input module 152 configured to receive a voice from an outside to generate voice data, a communication interface 170, a memory 130, and a processor 120 electrically connected to the voice input module 152, the communication interface 170, and the memory 130. The memory 130 may store one or more images or videos, and the memory 130 may include instructions, the instructions, when executed by the processor, causing the electronic device 101 to generate voice data on a voice received through the voice input module 152 with respect to a first image or video stored on the memory 130, link the voice data or first metadata information based on the voice data, with the first image or video, and transmit the first image or video and the linked voice data or the first metadata information to the outside of the electronic device 101 through the communication interface 170.

According to various embodiments of the present disclosure, the electronic device 101 may transmit a request for requiring one or more images or videos associated with the linked voice data or the first metadata information to the outside of the electronic device 101 and may receive one or more images or videos linked with (1) the voice data, (2) the first metadata information, or (3) second metadata information 320b generated from the voice data and/or the first metadata information from the outside of the electronic device 101.

As an additional or general exemplification, an electronic device 101 may include a voice input module 152 configured to obtain voice data on a specific image 300, and a control module 120 configured to analyze the voice data to determine at least one metadata information 320 of the specific image 300. Here, the control module 120 may register the voice data as a voice tag with respect to at least one association image, which satisfies a specific reference with respect to the specific image 300 or the determined metadata information 320, from among a plurality of images. According to various embodiments of the present disclosure, the plurality of metadata information 320 may include at least one of information on a location or a time where the specific image 300 is captured, information on a device capturing the specific image 300, or information on a shooting mode of the specific image 300.

According to various embodiments of the present disclosure, the electronic device 101 may further include a shooting module. If the specific image 300 is captured by the shooting module 180, the control module 120 may be configured to activate the voice input module to guide obtaining of the voice data.

Furthermore, the control module 120 may be configured to provide a user interface (UI) for guiding obtaining of the voice data if the specific image 300 is selected, to register a text tag, which is obtained by converting the voice data into a text, together with the voice tag with respect to the at least one image, or to analyze the voice data using an object appearing at the specific image 300.

According to various embodiments of the present disclosure, the control module 120 may determine at least one portion of metadata information 320 among information on the location, the time, the capturing device, and the shooting mode, based on a relation between an analysis result of the voice data and each of the plurality of information. In this case, the control module 120 may determine an image, which includes location information belonging within a specific range from the position of the specific image 300 as metadata information 320, from among the plurality of images as the at least one association image, may determine an image, which includes time information belonging within a specific range from the time of the specific image 300 as metadata information 320, from among the plurality of images as the at least one association image, or may determine an image, which includes location information having a specific relation with the time of the specific image 300 as metadata information 320, from among the plurality of images as the at least one association image. Meanwhile, the control module 120 may determine an image, which has a similarity of a threshold value or more to the specific image 300, from among the plurality of images as the at least one association image.

Also, according to various embodiments of the present disclosure, at least a part of the plurality of images may be stored on an external device functionally connected with the electronic device 101, and the electronic device 101 may further include a communication module communicating with the external device.

Meanwhile, an electronic device 101 according to various embodiments of the present disclosure may provide a search function using the voice tag. For example, the electronic device 101 may include a memory 130, a voice obtaining module 152 configured to obtain voice data and a processor 120 configured to search for at least one image from a plurality of images or videos based on the obtained voice data. The memory 130 may include instructions, the instructions, when executed by the processor 120, causing the electronic device 101 to find and provide at least one image of an image or video (1) linked with a voice tag corresponding to the voice data of the plurality of images or videos, (2) linked with first metadata information based on the voice data, or (3) linked with the voice data and/or the second metadata information 320b generated from the first metadata information. Furthermore, at least a part of the plurality of images or videos may be stored on an external device functionally connected with the electronic device 101. Moreover, in the case where the electronic device 101 further includes a communication module, the memory may further include instructions which makes it possible to transmit a request for calling an image or video search result based on the voice data to the external device and to provide at least a part of a search result received from the external device.

Below, a voice tag registration method according to various embodiments of the present disclosure will be described. The following methods may be executed by an electronic device (e.g., electronic device 101). Furthermore, an order disclosed in an illustrated flow chart may follow a logical flow, not a temporal order, and respective operations may be performed at the same time unless logically conflicted or may be performed according to any other order. Moreover, various modification and expansion described with reference to FIGS. 1 to 5 may be applied to the following methods.

Figure 6:
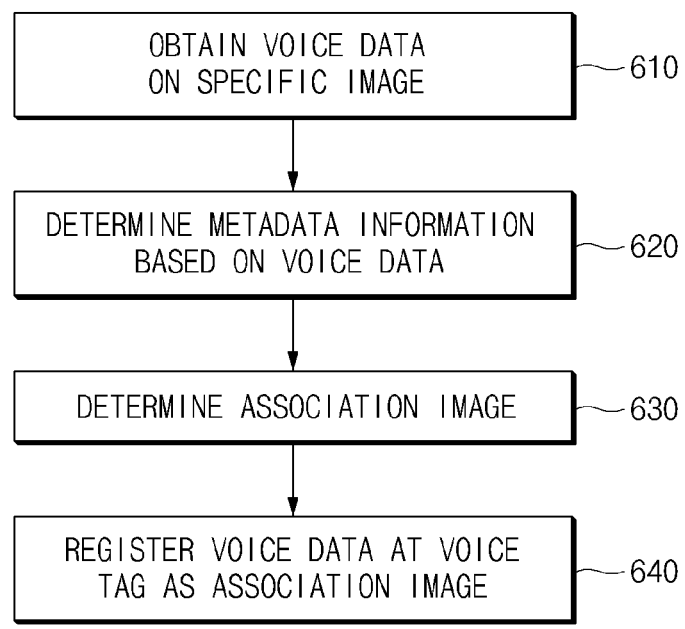
FIG. 6 is a diagram schematically illustrating a voice tag registration method, according to various embodiments of the present disclosure.

FIG. 6 is a diagram schematically illustrating a voice tag registration method according to various embodiments of the present disclosure.

In operation 610, an electronic device 101 may obtain voice data on a specific image (e.g., specific image 300). For example, an input/output interface 150 or a voice input module 152 may obtain user utterance as voice data. Furthermore, in the case where an image at which a voice tag is registered is displayed or a voice tag icon (e.g., an voice tag icon 241 and the like of FIG. 2) is selected at an image at which a voice tag is registered, the electronic device 101 may obtain voice data corresponding to a voice tag stored on a memory 130.

Operation 610 may be performed after a user captures an object (e.g., a screen 210 and the like of FIG. 2) or may be performed after the user selects a specific image at a gallery application (e.g., a screen 250 of FIG. 2).

In operation 620, an electronic device 101 (or a processor 120 of the electronic device 101) may determine metadata information 320 based on voice data. The specific image may have pieces of metadata information 320, and the electronic device 101 may analyze the voice data to determine at least one metadata information 320, which is determined as being associated with the voice data, from among the pieces of metadata information 320. For example, a metadata information 320 determination method described with reference to FIG. 3 may be applied to operation 620.

In operation 630, the electronic device 101 may determine an association image, which is determined as being associated with a specific image 300, using an object included in the specific image 300 or subject information (e.g., image information 310) appearing at the specific image and/or the at least one metadata information 320 determined in operation 620.

In operation 630, various references may be used to determine an association image. For example, there may be used references such as a similarity of a constant level, correspondence of metadata information 320, similarity, relation satisfaction, and the like between images. In this connection, references and conditions described with reference to FIGS. 3 and 4 may be applied to operation 630.

In operation 640, the electronic device 101 may register the voice data obtained in operation 610 at images, which are determined as association images in operation 630, as a voice tag. Images at which a voice tag is registered may be displayed together with an icon (e.g., a voice input icon 241 of FIG. 2) indicating that a voice tag is registered.

According to various embodiments of the present disclosure, a plurality of voice tags may be registered at one image. For example, operations 610, 620, 630, and 640 may be again performed with respect to any other voice input on an image at which a voice tag is registered, thereby making it possible to register any other voice tag. An image at which a plurality of tags is registered may include a plurality of marks such as an icon 241.

According to various embodiments of the present disclosure, the electronic device 101 may continuously obtain a voice input (e.g., a voice input of "summer" or a voice input of "sea") in operation 610 and may register the respective voice tags (e.g., "summer" and "sea") at association images (e.g., an association image group A or an association image group B) determined using metadata information 320 (e.g., time information or position information) which is determined based on each voice input. According to some embodiments of the present disclosure, the electronic device 101 may obtain a voice input (e.g., "summer sea") in operation 610, may divide the obtained voice input by the meaning or by the word to determine metadata information 320, and may determine an association image using the divided voice input to register the voice tag ("summer sea"). In this case, images having a voice tag of "summer sea" may be provided as a search result even though a search operation is performed using "summer," "sea" or "summer sea."

Figure 7:
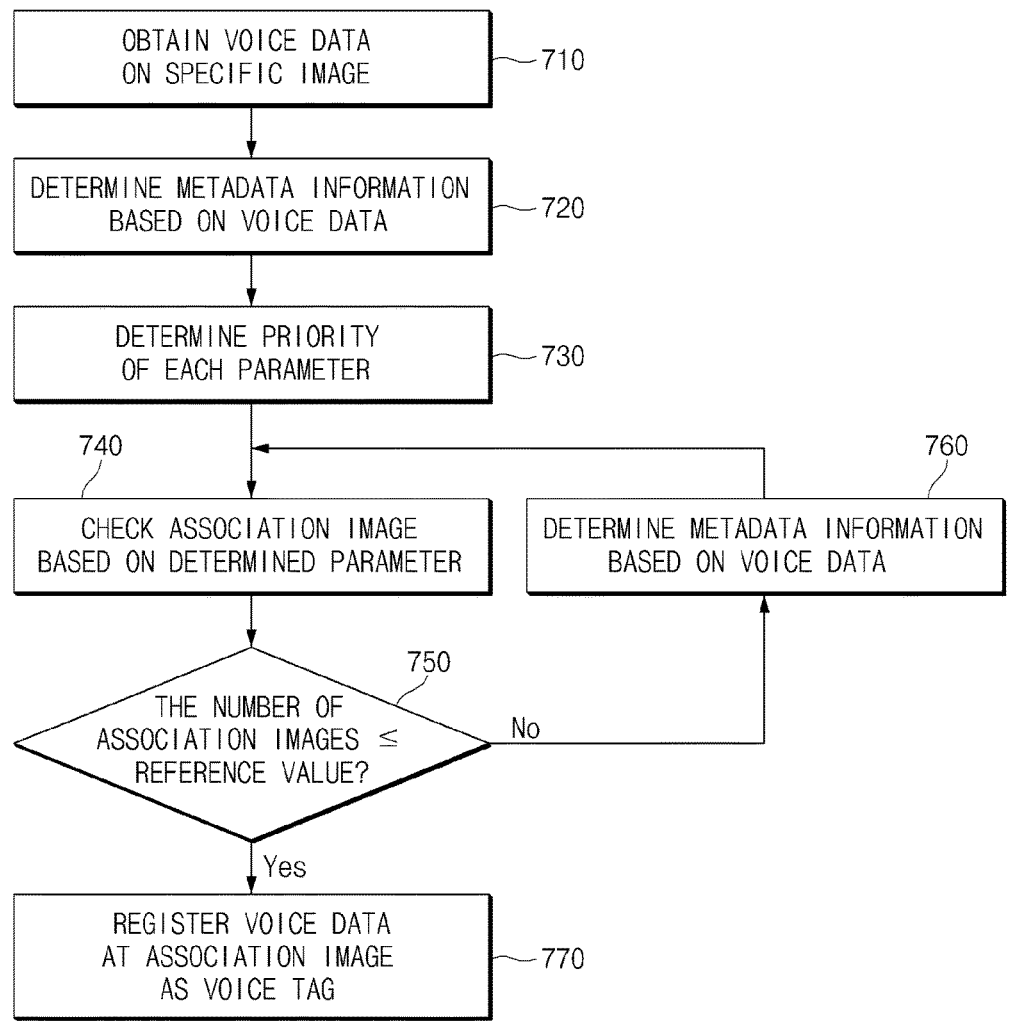
FIG. 7 is a diagram schematically illustrating a method for determining association images using a parameter priority, according to various embodiments of the present disclosure.

FIG. 7 is a diagram schematically illustrating a method for determining association images using a parameter priority, according to various embodiments of the present disclosure. In a description associated with FIGS. 7 and 8 to 10, a description duplicated or similar with the above description may be omitted.

In operation 710, an electronic device 101 may obtain voice data on a specific image 300. In operation 720, the electronic device 101 may determine metadata information 320 based on the obtained voice data. Operation 710 and operation 720 may correspond to operation 610 and operation 620 of FIG. 6.

In operation 730, the electronic device 101 may determine priorities of image information and metadata information 320. For example, an embodiment of FIG. 4 may be understood as an association image is determined under the condition that a priority of location information is higher than that of image information.

The image information and pieces of metadata information 320 may be understood as parameters for determining an association image. The electronic device 101 may determine a priority of each parameter. Different references may be applied to the parameters in determining an association image(s). For example, determining of a similarity according to image processing may be applied to the image information as a reference, and determining on whether to have a date as metadata information 320 may be applied to the time information as a reference.

In operation 740, the electronic device 101 may determine an association image by applying a parameter according to a priority. For example, the electronic device 101 may determine a candidate for an association image (hereinafter referred to as an "association image candidate"), which is determined as being associated with a specific image 300, from among a plurality of stored images by applying a parameter of the highest priority and a determining reference thereon.

In operation 750, the electronic device 101 may determine whether an association image determined in operation 740, that is, an association image candidate satisfies a specific range. The specific range may be determined by an input of a user or a setting of the electronic device 101 (it can be previously determined). For example, the electronic device 101 may determine whether the number of association image candidates is smaller than a reference value (e.g., 15). If the number of association image candidates satisfies the specific range (e.g., 13), the association image candidates may be determined as association images. In operation 770, the electronic device 101 may input voice data obtained in operation 710 at the association images (in this case, the same as the association image candidates) as a voice tag.

If the number of association image candidates does not satisfy the specific range (e.g., 49), in operation 760, the electronic device 101 may determine a parameter of a second priority. In operation 740, the electronic device 101 may again determine an association image with respect to the determined parameter (a parameter of a second priority). An association image candidate (second) determined according to the determining result may satisfy both a condition of the parameter of the highest priority and a condition of the parameter of the second priority. The electronic device 101 may repeat a process of operation 740, operation 750, and operation 760 until the number of association image candidates satisfies the specific range.

Figure 8:
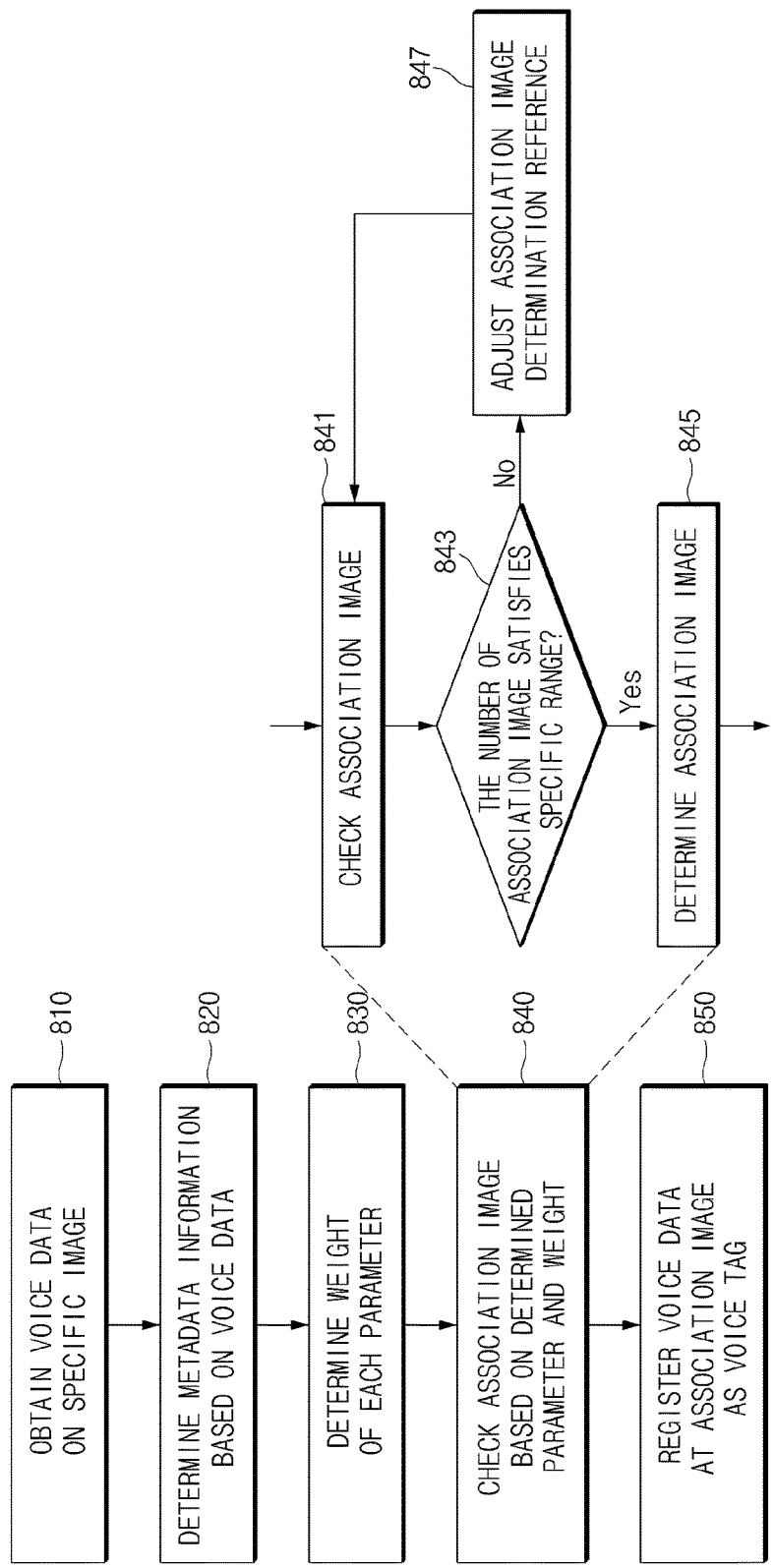
FIG. 8 is a diagram schematically illustrating a method for determining association images using a weight of a parameter, according to various embodiments of the present disclosure.

FIG. 8 is a diagram schematically illustrating a method for determining association images using a weight of a parameter, according to various embodiments of the present disclosure.

In operation 810, an electronic device 101 may obtain voice data on a specific image. In operation 820, the electronic device 101 may determine at least portion of one metadata information 320 based on the obtained voice data. Operation 810 and operation 820 may correspond to operation 610 and operation 620 of FIG. 6.

In operation 830, the electronic device 101 may determine a weight of each parameter. For example, the electronic device 101 may determine a weight of 1 with respect to image information and a weight of 0.8 with respect to time information. A weight may be differently set according to a result of analyzing the voice data obtained in operation 810 or according to a situation.

In operation 840, the electronic device 101 may determine an association image based on the determined parameter and weight. For example, in the case where an image has a similarity of 80% to a specific image (e.g., specific image 300), is placed within a radius of 1 Km from a shooting site of the specific image (e.g., specific image 300), and is captured at the same date as a date when the specific image (e.g., specific image 300) is captured, a total score of 2.1 may be obtained by applying a score of (0.8(80%)*1 (weight)) to the image information, a score of (1(location conversion score)*0.5(weight)) to the location information, and a score of (1(time conversion score)*0.8) to the time information, respectively. Here, the location conversion score may be 1 when an image belongs within 1 Km from a position where the specific image (e.g., specific image 300) is captured, 0.8 when an image belongs within 2 Km from the position, 0.6 when an image belongs within 3 Km from the position, 0.4 when an image belongs within 4 Km from the position, and 0 when an image exceeds 5 Km from the position. Meanwhile, the time conversion score may be 1 when a date is the same as a date when the specific image (e.g., specific image 300) is captured and 0 when a date is different from a date when the specific image (e.g., specific image 300) is captured. Each score conversion manner may be differently set according to a user setting or a voice data analysis result. For example, if the voice data analysis result indicates that the voice data is a voice input (e.g., Maldives) associated with the location information, a high weight may be set to location information of metadata information 320. If the voice data analysis result indicates that the voice data is a voice input (e.g., sunrise) associated with the time information, a high weight may be set to time information of metadata information 320.

If a score of each image as an association image candidate is determined, the electronic device 101 may determine an image, of which the score is greater than or equal to a reference score, as an association image. For example, in the case where the reference score is 1.5, the electronic device 101 may determine an image, of which the score is greater than or equal to 1.5, as an association image. If the association image is determined, the electronic device 101 may register the voice data obtained in operation 810 as a voice tag.

According to various embodiments of the present disclosure, the electronic device 101 may adjust the reference score to change the number of association images. For example, in the case where the number of association images is set to be smaller than or equal to 20, the number of association images satisfying the reference score may exceed 20. For example, in the case where the number of association images does not satisfy a specific range (e.g., smaller than or equal to 20) (operation 843), the electronic device 101 may adjust (e.g., increase) a determining reference of an association image in operation 847, for example, the reference score to allow the number of association images to belong to a specific range. In operation 847, the electronic device 101 may adjust the association image determination reference and return to operation 841. In operation 845, the electronic device 101 may determine images satisfying a finally set range as association images. In operation 850, the electronic device 101 registers the voice data at the association image as a voice tag.

Figure 9:
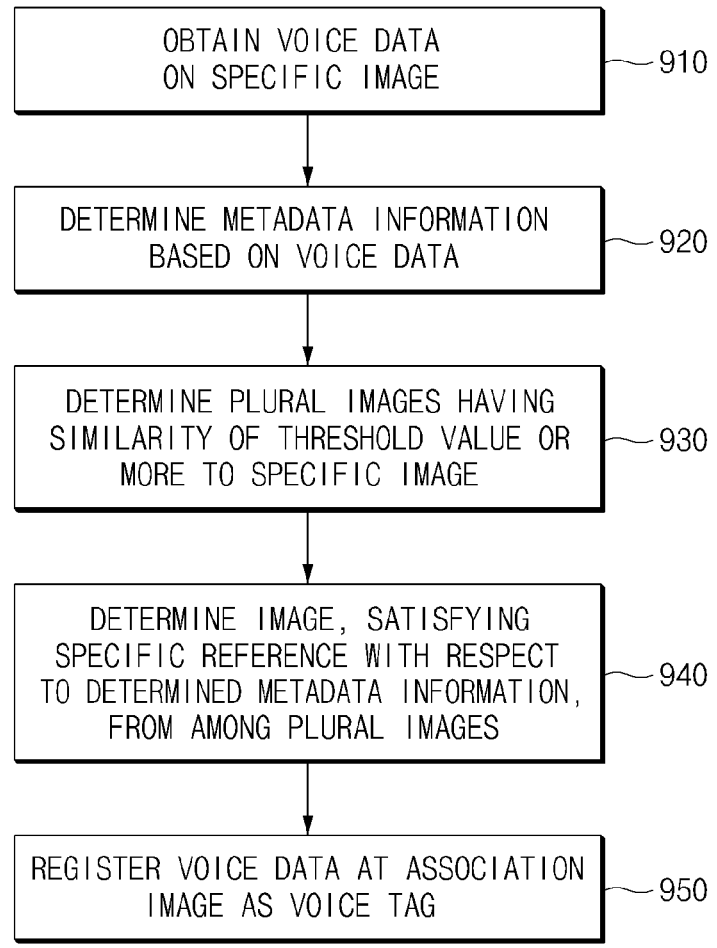
FIG. 9 is a diagram schematically illustrating a voice tag registration method, according to various embodiments of the present disclosure.

FIG. 9 is a diagram schematically illustrating a voice tag registration method according to various embodiments of the present disclosure.

In operation 910, an electronic device 101 may obtain voice data on a specific image 300. In operation 920, the electronic device 101 may determine metadata information 320 based on the obtained voice data. Operation 910 and operation 920 may correspond to operation 610 and operation 620 of FIG. 6.

In operation 930, the electronic device 101 may determine at least one image having a similarity value equal to or higher than a threshold value or more to a specific image 300. For example, the electronic device 101 may determine a plurality of images including an object which is similar to an object included in specific image 300 or images being similar to the specific image 300, based on image information 310.

In operation 940, the electronic device 101 may determine an image, satisfying a specific reference with respect to the metadata information 320 determined in operation 920, from among the plurality of images determined in operation 930. In operation 950, the electronic device 101 may register the voice data obtained in operation 910 at the image determined in operation 940 as a voice tag.

The registration of a voice tag using a priority or weight, described with reference to FIG. 7 or 8, may be applied to a method of FIG. 9 through suitable modification or change. Since the method described with reference to FIG. 9 basically uses a similarity of an object (visual information of an image) appearing at an image, a priority or weight may be only applied to metadata information 320 determined in operation 920.

Figure 10:
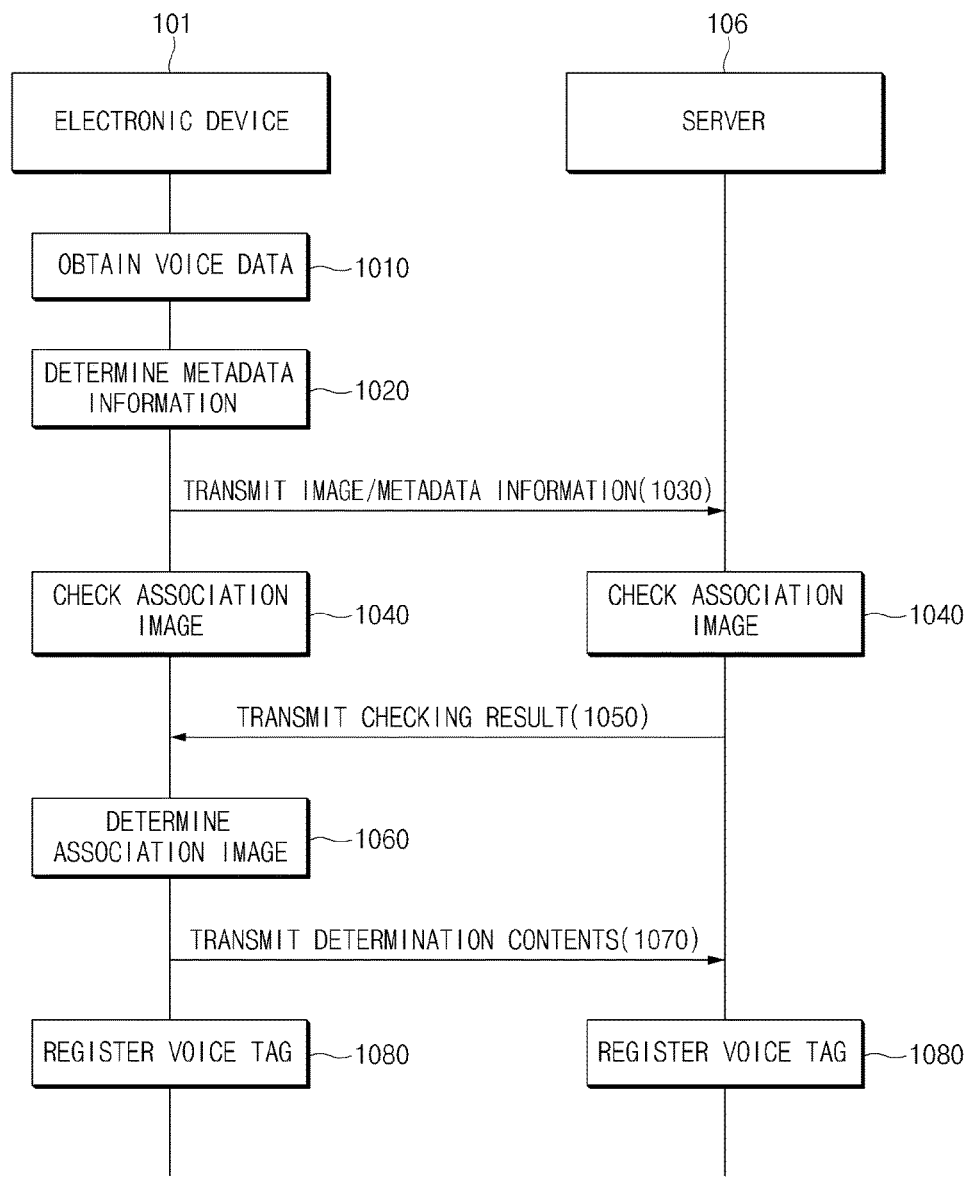
FIG. 10 is a diagram schematically illustrating a method for registering voice tags at images stored on an electronic device and a server, according to various embodiments of the present disclosure.

FIG. 10 is a diagram schematically illustrating a method for registering voice tags 166 at images stored on an electronic device 101 and a server 106, according to various embodiments of the present disclosure.

In general, an image captured by a user terminal may be stored on the same user terminal. However, recently, there has been increased interest in storing images and image information in various locations, e.g., images stored on the user terminal, images stored on a personal computer (PC) or a laptop of the user, images stored on a tablet of the user, images stored on a social account of the user, images stored on a cloud server of the user, and the like are managed using a user account and the like. A method for determining an association image with respect to an image not stored on a user terminal to register a voice tag under the above-described condition will be described with reference to FIG. 10. A method for registering voice tags at images stored on an electronic device 101 and a server 106 may be exemplarily illustrated in FIG. 10 for the sake of easy description. The server 106 may include various devices (e.g., a cloud server, a user PC, a tablet, and the like), not a user terminal (i.e., an electronic device 101).

In operation 1010, an electronic device 101 may obtain voice data on a specific image (e.g., specific image 300). In operation 1020, the electronic device 101 may determine metadata information 320 based on the obtained voice data. Operation 1010 and operation 1020 may correspond to operation 610 and operation 620 of FIG. 6.

According to various embodiments of the present disclosure, operation 1010 may be performed in connection with any other device connected with the electronic device 101. For example, it may be possible to obtain voice data from a wearable device (e.g., a smart watch and the like) connected (e.g., Bluetooth connected) with the electronic device 101, with respect to a specific image (e.g., specific image 300) stored on the electronic device 101. Here, the wearable device may include a voice recognition module (e.g., a microphone) for obtaining voice data and may provide the obtained voice data (or a result of analyzing/processing obtained voice data) to the electronic device 101 through a connected communication channel (e.g., a Bluetooth communication channel).

In operation 1030, the electronic device 101 may transmit image information and metadata information 320 to the server 106 through a communication module (e.g., a communication interface 170). When transmitting the information, the electronic device 101 may also transmit a message/instruction which causes the server 106 to determine an association image with respect to an image, stored on the server 106, based on the information and to transmit a determination result to the electronic device 101.

In operation 1040, each of the electronic device 101 and the server 106 may determine an association image on a specific image (e.g., specific image 300). Operation 1040 may be performed by both the electronic device 101 and the server 106 or may be performed only by the server 106. In operation 1050, the server 106 may transmit a result of determining an association image to the electronic device 101. If the number of association images is limited, the server 106 may transmit score or priority information calculated with respect to each image, together with the determining result. According to various embodiments of the present disclosure, the server 106 may transmit an association image determining result which is determined according to a request or another condition of the electronic device 101 to fit to a specific number (or a specific range).

In operation 1060, the electronic device 101 may determine an association image by combining a result determined at the electronic device 101 and a result received from the server 106. As one exemplification, the electronic device 101 may determine an image, which is determined as an association image of images stored on the electronic device 101, and an image, which is included in a result determined as an association image at the server 106, as association images. As another exemplification, after combining determining results of the electronic device 101 and the server 106, the electronic device 101 may determine association images of which the number is designated according to a reference (e.g., a calculated score and the like).

In operation 1070, the electronic device 101 may transmit the determination result of operation 1060 to the server 106.

In operation 1080, each of the electronic device 101 and the server 106 may register voice data at an association image corresponding to the determination result of operation 1060 as a voice tag.

According to various embodiments of the present disclosure, a method for registering a voice tag may include obtaining voice data on at least one image, determining at least one metadata information 320 of a specific image (e.g., specific image 300) based on the voice data, determining at least one association image which satisfies a specific reference with respect to the specific image (e.g., specific image 300) or the determined metadata information 320, and registering the voice data at the at least one association image as a voice tag. Here, the determining of the at least one association image may include determining association image candidates based on the specific image (e.g., specific image 300) or a priority of the determined metadata information 320, determining whether the number of the association image candidates satisfies a specific range, and determining at least a part of the association image candidates as the association images according to whether the number of the association image candidates satisfies the specific range. The method may further include sequentially applying the specific image (e.g., specific image 300) or the determined metadata information 320 according to the priority if the specific range is not satisfied.

According to various embodiments of the present disclosure, the determining of the at least one association image may include determining a weight with respect to the specific image or the determined metadata information 320, calculating a score of each association image candidate based on the specific image (e.g., specific image 300) or the determined metadata information 320 and the weight on each of the specific image (e.g., specific image 300) and the determined metadata information 320, and determining at least a part of the association image candidates as association images according to whether to satisfy a reference score on the calculated score. Here, the method may further include determining all the association image candidates as the association image if the number of the association image candidates satisfies a specific range. The method may further include adjusting the reference score if the number of the association image candidates does not satisfy the specific range.

According to various embodiments of the present disclosure, a method for registering a voice tag at a specific image (e.g., specific image 300) at an electronic device 101 may include obtaining voice data on the specific image (e.g., specific image 300), determining at least one of a plurality of metadata information 320 of the specific image (e.g., specific image 300) based on the voice data, determining a plurality of images each having a similarity of a threshold value or more to the specific image (e.g., specific image 300), and registering the voice data on at least one, which satisfies a specific reference with respect to the determined metadata information 320, from among the plurality of images as a voice tag.

Figure 11:
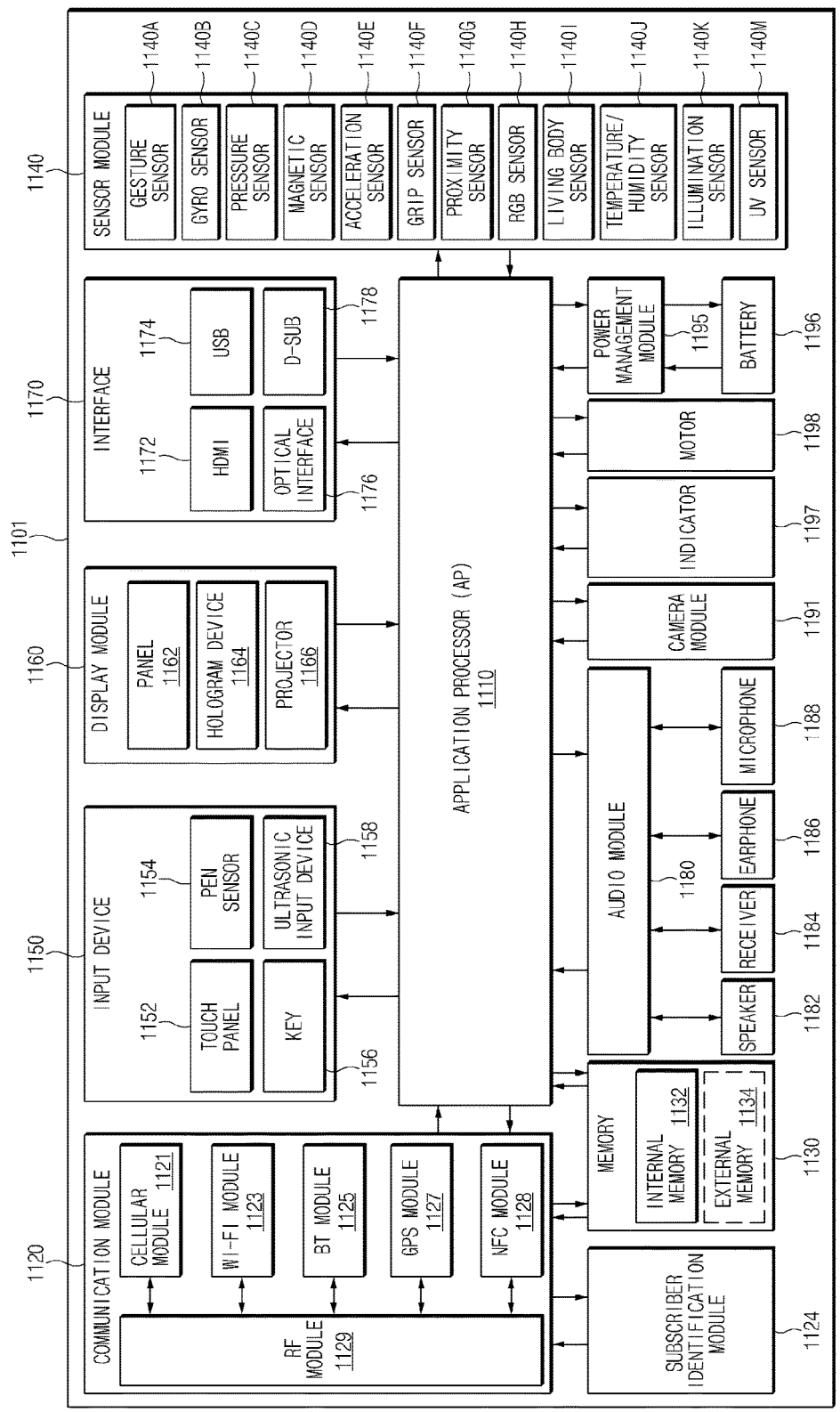
FIG. 11 is a block diagram illustrating an electronic device, according to various embodiments of the present disclosure.

FIG. 11 is a block diagram illustrating an electronic device according to various embodiments of the present disclosure.

Referring to FIG. 11, an electronic device 1101 may include, for example, all or a part of an electronic device 101 illustrated in FIG. 1. The electronic device 1101 may include one or more processors (e.g., an application processor (AP)) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive an operating system (OS) or an application to control a plurality of hardware or software components connected to the processor 1110 and may process and compute a variety of data. The processor 1110 may be implemented with a System on Chip (SoC), for example. According to an embodiment of the present disclosure, the processor 1110 may further include a graphic processing unit (GPU) and/or an image signal processor. The processor 1110 may include at least a part (e.g., a cellular module 1121) of components illustrated in FIG. 11. The processor 1110 may load and process an instruction or data, which is received from at least one of other components (e.g., a nonvolatile memory), and may store a variety of data at a nonvolatile memory.

The communication module 1120 may be configured the same as or similar to a communication interface 170 of FIG. 1. The communication module 1120 may include a cellular module 1121, a wireless-fidelity (Wi-Fi) module 1123, a Bluetooth (BT) module 1125, a global positioning system (GPS) module 1127, a near field communication (NFC) module 1128, and a radio frequency (RF) module 1129.

The cellular module 1121 may provide voice communication, video communication, a character service, an Internet service or the like through a communication network. According to an embodiment of the present disclosure, the cellular module 1121 may perform discrimination and authentication of an electronic device 1101 within a communication network using a subscriber identification module (e.g., a SIM card) 1124, for example. According to an embodiment of the present disclosure, the cellular module 1121 may perform at least a portion of functions that the processor 1110 provides. According to an embodiment of the present disclosure, the cellular module 1121 may include a communication processor (CP).

Each of the Wi-Fi module 1123, the BT module 1125, the GPS module 1127, and the NFC module 1128 may include a processor for processing data exchanged through a corresponding module, for example. According to an embodiment of the present disclosure, at least a portion (e.g., two or more components) of the cellular module 1121, the Wi-Fi module 1123, the BT module 1125, the GPS module 1127, and the NFC module 1128 may be included within one Integrated Circuit (IC) or an IC package.

The RF module 1129 may transmit and receive a communication signal (e.g., an RF signal). The RF module 1129 may include a transceiver, a power amplifier module (PAM), a frequency filter, a low noise amplifier (LNA), an antenna, or the like. According to various embodiments of the present disclosure, at least one of the cellular module 1121, the Wi-Fi module 1123, the BT module 1125, the GPS module 1127, or the NFC module 1128 may transmit and receive an RF signal through a separate RF module.

The subscriber identification module 1124 may include, for example, a subscriber identification module and may include unique identify information (e.g., integrated circuit card identifier (ICCID)) or subscriber information (e.g., integrated mobile subscriber identity (IMSI)).

The memory 1130 (e.g., a memory 130) may include an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1134 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1134 may be functionally and/or physically connected to the electronic device 1101 through various interfaces.

The sensor module 1140 may measure, for example, a physical quantity or may detect an operation state of the electronic device 1101. The sensor module 1140 may convert the measured or detected information to an electric signal. The sensor module 1140 may include at least one of a gesture sensor 1140A, a gyro sensor 1140B, a pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a living body sensor 1140I, a temperature/humidity sensor 1140J, an illuminance sensor 1140K, or an UV sensor 1140M. Although not illustrated, additionally or generally, the sensor module 1140 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1140 may further include a control circuit for controlling at least one or more sensors included therein. According to an embodiment of the present disclosure, the electronic device 1101 may further include a processor which is a part of the processor 1110 or independent of the processor 1110 and is configured to control the sensor module 1140. The processor may control the sensor module 1140 while the processor 1110 remains at a sleep state.

The input device 1150 may include, for example, a touch panel 1152, a (digital) pen sensor 1154, a key 1156, or an ultrasonic input unit 1158. The touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, a keypad, and the like. The ultrasonic input unit 1158 may detect (or sense) an ultrasonic signal, which is generated from an input device, through a microphone (e.g., a microphone 288) and may determine data corresponding to the detected ultrasonic signal.

The display 1160 (e.g., a display 160) may include a panel 1162, a hologram device 1164, or a projector 1166. The panel 1162 may be configured the same as or similar to a display 160 of FIG. 1. The panel 1162 and the touch panel 1152 may be integrated into a single module. The hologram device 1164 may display a stereoscopic image in a space using a light interference phenomenon. The projector 1166 may project light onto a screen so as to display an image. The screen may be arranged in the inside or the outside of the electronic device 1101. According to an embodiment of the present disclosure, the display 1160 may further include a control circuit for controlling the panel 1162, the hologram device 1164, or the projector 1166.

The interface 1170 may include, for example, an HDMI (high-definition multimedia interface) 1172, a USB (universal serial bus) 1174, an optical interface 1176, or a D-sub (D-subminiature) 1178. The interface 1170 may be included, for example, in a communication interface 170 illustrated in FIG. 1. Additionally or generally, the interface 1170 may include, for example, a mobile high definition link (MHL) interface, a SD card/multi-media card (MMC) interface, or an infrared data association (IrDA) standard interface.

The audio module 1180 may convert a sound and an electric signal in dual directions. At least a portion of the audio module 1180 may be included, for example, in an input/output interface 150 illustrated in FIG. 1. The audio module 1180 may process, for example, sound information that is input or output through a speaker 1182, a receiver 1184, an earphone 1186, or a microphone 1188.

The camera module 1191 for shooting a still image or a video may include, for example, at least one image sensor (e.g., a front sensor or a rear sensor), a lens, an image signal processor (ISP), or a flash (e.g., an LED or a xenon lamp).

The power management module 1195 may manage, for example, power of the electronic device 1101. According to an embodiment of the present disclosure, a power management integrated circuit (PMIC) a charger IC, or a battery or fuel gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a portion thereof (e.g., a processor 1110), such as a booting state, a message state, a charging state, and the like. The motor 1198 may convert an electrical signal into a mechanical vibration and may generate the following effects: vibration, haptic, and the like. Although not illustrated, a processing device (e.g., a GPU) for supporting a mobile TV may be included in the electronic device 1101. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 12:
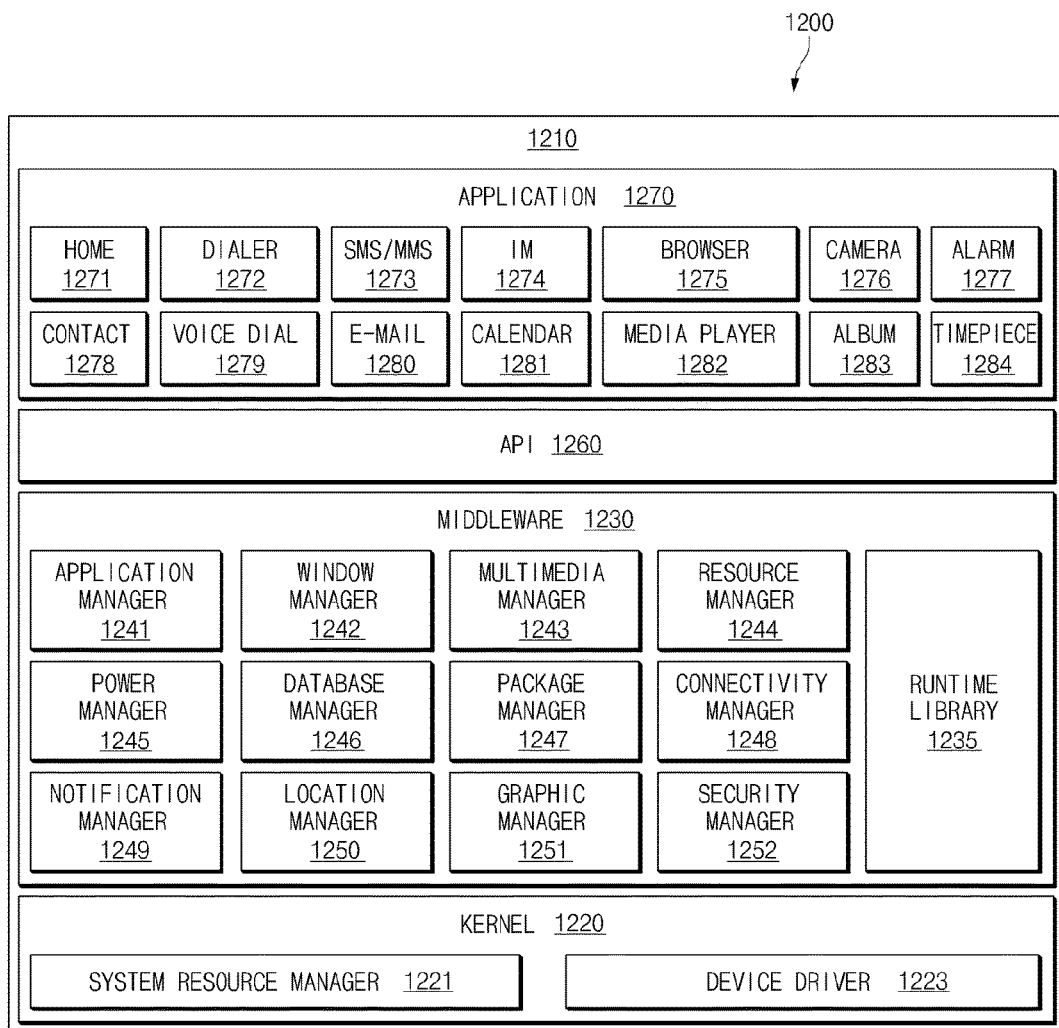
FIG. 12 illustrates a block diagram of a program module, according to various embodiments of the present disclosure.

FIG. 12 illustrates a block diagram of a program module according to various embodiments of the present disclosure.

Referring to FIG. 12, according to an embodiment of the present disclosure, a program module 1210 (e.g., a program 140) may include an operating system (OS) to control resources associated with an electronic device (e.g., an electronic device 101), and/or diverse applications (e.g., an application program 147) driven on the OS. The OS may be, for example, Android, iOS, Windows, Symbian, Tizen, or Bada.

The program module 1210 may include a kernel 1220, a middleware 1230, an application programming interface (API) 1260, and/or an application 1270. At least a part of the program module 1210 may be preloaded on an electronic device or may be downloadable from an external electronic device (e.g., an external electronic device 102 or 104, a server 106, and the like).

The kernel 1220 (e.g., a kernel 141) may include, for example, a system resource manager 1221 or a device driver 1223. The system resource manager 1221 may perform control, allocation, or retrieval of system resources. According to an embodiment of the present disclosure, the system resource manager 1221 may include a process managing part, a memory managing part, or a file system managing part. The device driver 1223 may include, for example, a display driver, a camera driver, a Bluetooth driver, a common memory driver, an USB driver, a keypad driver, a Wi-Fi driver, an audio driver, or an inter-process communication (IPC) driver.

The middleware 1230 may provide, for example, a function which the application 1270 needs in common, or may provide diverse functions to the application 1270 through the API 1260 to allow the application 1270 to efficiently use limited system resources of the electronic device. According to an embodiment of the present disclosure, the middleware 1230 (e.g., a middleware 143) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252.

The runtime library 1235 may include, for example, a library module which is used by a compiler to add a new function through a programming language while the application 1270 is being executed. The runtime library 1235 may perform input/output management, memory management, or capacities about arithmetic functions.

The application manager 1241 may manage, for example, a life cycle of at least one application of the application 1270. The window manager 1242 may manage a GUI resource which is used in a screen. The multimedia manager 1243 may identify a format necessary for playing diverse media files, and may perform encoding or decoding of media files by using a codec suitable for the format. The resource manager 1244 may manage resources such as a storage space, memory, or source code of at least one application of the application 1270.

The power manager 1245 may operate, for example, with a basic input/output system (BIOS) to manage a battery or power, and may provide power information for an operation of an electronic device. The database manager 1246 may generate, search for, or modify database which is to be used in at least one application of the application 1270. The package manager 1247 may install or update an application which is distributed in the form of a package file.

The connectivity manager 1248 may manage, for example, wireless connection, such as Wi-Fi or Bluetooth. The notification manager 1249 may display or notify an event such as arrival message, promise, or proximity notification in a mode that does not disturb a user. The location manager 1250 may manage location information of an electronic device. The graphic manager 1251 may manage a graphic effect that is provided to a user, or manage a user interface relevant thereto. The security manager 1252 may provide a general security function necessary for system security or user authentication. According to an embodiment of the present disclosure, in the case where an electronic device (e.g., an electronic device 101) includes a telephony function, the middleware 1230 may further includes a telephony manager for managing a voice or video call function of the electronic device.

The middleware 1230 may include a middleware module that combines diverse functions of the above-described components. The middleware 1230 may provide a module specialized to each OS kind to provide differentiated functions. Additionally, the middleware 1230 may remove a part of the preexisting components, dynamically, or may add a new component thereto.

The API 1260 (e.g., an API 145) may be, for example, a set of programming functions and may be provided with a configuration which is variable depending on an OS. For example, in the case where an OS is the android or the iOS, it may be permissible to provide one API 1260 set per platform. In the case where an OS is Tizen, it may be permissible to provide two or more API 1260 sets per platform.

The application 1270 (e.g., an application program 147) may include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, and a timepiece 1284, or for offering health care (e.g., measuring an exercise quantity or blood sugar) or environment information (e.g., atmospheric pressure, humidity, or temperature).

According to an embodiment of the present disclosure, the application 1270 may include an application (hereinafter referred to as "information exchanging application" for descriptive convenience) to support information exchange between the electronic device (e.g., an electronic device 101) and an external electronic device (e.g., an external electronic device 102 or 104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., an external electronic device 102 or 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., an external electronic device 102 or 104) which communicates with the electronic device 101, an application running in the external electronic device, or a service (e.g., a call service or a message service) provided from the external electronic device.

According to an embodiment of the present disclosure, the application 1270 may include an application (e.g., a health care application) which is assigned in accordance with an attribute (e.g., an attribute of a mobile medical device as a kind of electronic device) of the external electronic device (e.g., an external electronic device 102 or 104). According to an embodiment of the present disclosure, the application 1270 may include an application which is received from an external electronic device (e.g., an external server 106 or an electronic device 102 or 104). According to an embodiment of the present disclosure, the application 1270 may include a preloaded application or a third party application which is downloadable from a server. The component titles of the program module 1210 according to the embodiment of the present disclosure may be modifiable depending on kinds of OSs.

According to various embodiments of the present disclosure, at least a portion of the program module 1210 may be implemented by software, firmware, hardware, or a combination of two or more thereof. At least a portion of the program module 1210 may be implemented (e.g., executed), for example, by a processor (e.g., a processor 120). At least a portion of the program module 1210 may include, for example, modules, programs, routines, sets of instructions, or processes, or the like for performing one or more functions.

The term "module" used herein may represent, for example, a unit including one or more combinations of hardware, software and firmware. The term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 120), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

For example, a computer-readable storage medium may include instructions, the instructions, which executed, causing an electronic device to generate voice data on a voice received with respect to a first image or video, link the voice data or first metadata information based on the voice data, with the first image or video, determine a relation between a second image or video and the first image or video, and link at least one of (1) the voice data, (2) the first metadata information, or (3) second metadata information 320b generated from the voice data and/or the first metadata information with the second image or video, based on at least a part of the determined relation. Besides, instructions for executing the above-described methods may be additionally or generally included.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, a user may manage or search for a desired photo among a plurality of photos, which are stored an electronic device or another location (device), using a voice tag. For example, the user may register a voice tag with respect to a specific photo or a photo having a relation with the specific photo and may search for a desired photo using a corresponding voice tag.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a voice input module;
a memory; and
a processor electrically connected to the voice input module and the memory,
wherein the memory is configured to store one or more images or videos, and
wherein the memory comprises instructions, the instructions, when executed by the processor, causing the electronic device to:
generate voice data on a voice received through the voice input module with respect to a first image or video stored on the memory,
link the voice data or first metadata information based on the voice data, with the first image or video,
determine a relation between a second image or video stored on the memory, and the first image or video, and link at least one of (1) the voice data, (2) the first metadata information, or (3) second metadata information generated from the voice data and/or the first metadata information with the second image or video, based on at least a part of the relation determined between the second image or video stored on the memory and the first image or video.

2. The electronic device of claim 1, wherein the electronic device links the first metadata information with the first image or video in the form of a tag, and wherein the electronic device is configured to link at least one of (1) the voice data, (2) the first metadata information, or (3) the second metadata information with the second image or video in the form of a tag.

3. The electronic device of claim 1, wherein the first metadata information comprises speech-to-text information extracted from the voice data.

4. The electronic device of claim 1, wherein the electronic device is configured to determine the relation using at least one of an image analysis, location information, time information, text information, or face recognition information associated with the first image or video and the second image or video.

5. An electronic device comprising:
a voice input module configured to receive a voice from an outside to generate voice data;
a communication module;
a memory; and
a processor electrically connected to the voice input module, the communication module, and the memory,
wherein the memory is configured to store one or more images or videos, and
wherein the memory comprises instructions, the instructions, when executed by the processor, causing the electronic device to:
generate voice data on a voice received through the voice input module with respect to a first image or video stored on the memory,
link the voice data or first metadata information based on the voice data, with the first image or video,
transmit the first image or video and the linked voice data or the first metadata information to the outside of the electronic device through the communication module,
transmit a request for requiring one or more images or videos associated with the linked voice data or the first metadata information to the outside of the electronic device, and
receive one or more images or videos linked with (1) the voice data, (2) the first metadata information, or (3) second metadata information generated from the voice data and/or the first metadata information from the outside of the electronic device.

6. An electronic device comprising:
a voice input module configured to obtain voice data on a specific image; and
a processor configured to:
analyze the voice data to determine at least one portion of metadata information of the specific image,
register the voice data as a voice tag with the specific image; and
register the voice data as the voice tag with at least one association image, which satisfies a specific reference association with respect to the specific image or the determined metadata information, from among a plurality of images.

7. The electronic device of claim 6, wherein a plurality of metadata information comprises at least one of information on a location or a time where the specific image is captured, information on a device capturing the specific image, or information on a shooting mode of the specific image.

8. The electronic device of claim 6, further comprising:
a shooting module,
wherein if the specific image is captured by the shooting module, the processor is configured to activate the voice input module to guide obtaining of the voice data.

9. The electronic device of claim 6, wherein the processor is configured to provide a user interface (UI) for guiding obtaining of the voice data if the specific image is selected.

10. The electronic device of claim 6, wherein the processor is configured to register a text tag, which is obtained by converting the voice data into a text, together with the voice tag with respect to the at least one association image.

11. The electronic device of claim 6, wherein the processor is configured to analyze the voice data using an object appearing at the specific image.

12. The electronic device of claim 7, wherein the processor is configured to determine at least one portion of metadata information among information on the location, the time, the device capturing the specific image, and the shooting mode, based on a relation between an analysis result of the voice data and each of the plurality of information.

13. The electronic device of claim 12, wherein the processor is configured to determine an image, which includes location information belonging within a specific range from a position of the specific image as metadata information, from among the plurality of images as the at least one association image.

14. The electronic device of claim 12, wherein the processor is configured to determine an image, which includes time information belonging within a specific range from the time of the specific image as metadata information, from among the plurality of images as the at least one association image.

15. The electronic device of claim 12, wherein the processor is configured to determine an image, which includes location information having a specific relation with the time of the specific image as metadata information, from among the plurality of images as the at least one association image.

16. The electronic device of claim 6, wherein the processor is configured to determine an image, which has a similarity of a threshold value or more to the specific image, from among the plurality of images as the at least one association image.

17. The electronic device of claim 6, wherein at least a part of the plurality of images is stored on an external device functionally connected with the electronic device, and
wherein the electronic device further comprises:
a communication module communicating with the external device.

18. A method for registering a voice tag, comprising:
obtaining voice data on at least one image;
determining at least one portion of metadata information for a specific image based on the voice data;
registering the voice data as a voice tag with the specific image;
determining at least one association image which satisfies a specific reference with respect to the specific image or the determined metadata information; and
registering the voice data as the voice tag with the at least one association image.

19. The method of claim 18, wherein the determining of the at least one association image comprises:
   determining association image candidates based on the specific image or a priority of the determined metadata information;
   determining whether a number of the association image candidates satisfies a specific range; and
   determining at least a part of the association image candidates as the association images according to whether the number of the association image candidates satisfies the specific range.

20. The method of claim 19, further comprising:
   if the specific range is not satisfied, sequentially applying the specific image or the determined metadata information according to the priority.

21. The method of claim 18, wherein the determining of the at least one association image comprises:
   determining a weight with respect to the specific image or the determined metadata information;
   calculating a score of each association image candidate based on the specific image or the determined metadata information and the weight on each of the specific image and the determined metadata information; and
   determining at least a part of the association image candidates as association images according to whether to satisfy a reference score based on a calculated score.

22. The method of claim 21, further comprising:
   if the number of the association image candidates satisfies a specific range, determining all the association image candidates as the association image.

23. The method of claim 21, further comprising:
   if the number of the association image candidates does not satisfy a specific range, adjusting the reference score.

24. A method for registering a voice tag at a specific image of an electronic device, the method comprising:
   obtaining voice data on the specific image;
   registering the voice data as a voice tag with the specific image;
   determining at least one of a plurality of metadata information of the specific image based on the voice data;
   determining a plurality of images each having a similarity value higher than a threshold value to the specific image; and
   registering the voice data as the voice tag with the determined plurality of images, which satisfies a specific reference with respect to the determined metadata information, from among the plurality of images as the voice tag.

25. A non-transitory computer-readable storage medium including an instruction, the instruction, when executed, causing an electronic device to:
   generate voice data on a voice received with respect to a first image or video,
   link first metadata information or second metadata information based on the voice data, with the first image or video,
   determine a relation between a second image or video and the first image or video, and link at least one of (1) the voice data, (2) the first metadata information, or (3) second metadata information generated from the voice data and/or the first metadata information with the second image or video, based on at least a part of the relation determined between a second image or video and the first image or video.

* * * * *